United States Patent
Zou

(10) Patent No.: US 8,406,636 B2
(45) Date of Patent: Mar. 26, 2013

(54) METHOD, SYSTEM AND DEVICE FOR PASSIVE OPTICAL NETWORK DATA TRANSMISSION

(75) Inventor: Shimin Zou, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 411 days.

(21) Appl. No.: 12/698,272

(22) Filed: Feb. 2, 2010

(65) Prior Publication Data

US 2010/0142944 A1 Jun. 10, 2010

Related U.S. Application Data

(63) Continuation of application No. PCT/CN2008/072070, filed on Aug. 20, 2008.

(30) Foreign Application Priority Data

Aug. 28, 2007 (CN) .......................... 2007 1 0145571

(51) Int. Cl.
*H04B 10/00* (2006.01)
(52) U.S. Cl. ............. 398/167; 398/52; 398/72; 398/140
(58) Field of Classification Search ............ 398/52, 398/72, 140, 167
See application file for complete search history.

(56) References Cited

U.S. PATENT DOCUMENTS

| | | | |
|---|---|---|---|
| 2008/0044182 A1* | 2/2008 | Frank et al. ...................... | 398/52 |
| 2008/0069564 A1* | 3/2008 | Bernard .......................... | 398/72 |

FOREIGN PATENT DOCUMENTS

| | | | |
|---|---|---|---|
| CN | 1250989 | A | 4/2000 |
| CN | 1434580 | A | 8/2003 |
| CN | 1719814 | A | 1/2006 |
| CN | 1855778 | A | 11/2006 |
| JP | 2003-209572 | A | 7/2003 |
| JP | 2004-15663 | A | 1/2004 |
| JP | 2006-157847 | A | 6/2006 |
| JP | 2007-124422 | A | 5/2007 |
| JP | 2008-532448 | A | 8/2008 |
| KR | 2004-0001028 | A | 1/2004 |
| WO | WO 2006/094960 | A1 | 9/2006 |

OTHER PUBLICATIONS

1st Office Action in corresponding Chinese Application No. 200710145571.4 (Jan. 26, 2011).
Extended European Search Report in corresponding European Application No. 08784061.7 (Nov. 26, 2010).
Written Opinion of the International Searching Authority in corresponding PCT Application No. PCT/CN2008/072070 (Nov. 27, 2008).

(Continued)

*Primary Examiner* — Danny Leung
(74) *Attorney, Agent, or Firm* — Leydig, Voit & Mayer, Ltd.

(57) ABSTRACT

A central office optical line terminal (S-OLT) and a local optical line terminal (L-OLT) are connected to through a transmission link form a transmission network. The S-OLT sends service data sent by a service network to the L-OLT through a transmission channel, receives the service data sent by the L-OLT from the transmission channel, and sends the service data to the service network. The L-OLT receives the service data sent by the S-OLT from the transmission channel and sends the service data to an optical network unit (ONU), and sends the service data sent by the ONU to the S-OLT through the transmission channel. Thus, the service data of the L-OLT is sent to the service network through the S-OLT, thereby solving a problem in the existing PON that the service data requires another transmission of the transmission network to reach the service network.

20 Claims, 10 Drawing Sheets

OTHER PUBLICATIONS

"G.7041/Y.1303—Generic framing procedure (GFP)," SERIES G: Transmission Systems and Media, Digital Systems and Networks Data Over Transport—Generic Aspects—General and SERIES Y: Global Information Infrastructure, Internet Protocol Aspects and Next-Generation Networks Internet Protocol Aspects—Transport, Aug. 2005, International Telecommunication Union, Geneva, Switzerland.

"G.707/Y.1322—Network node interface for the synchronous digital hierarchy (SDH)," SERIES G: Transmission Systems and Media, Digital Systems and Networks—Digital Terminal Equipments—General and SERIES Y: Global Information Infrastructure, Internet Protocol Aspects and Next-Generation Networks, Dec. 2003, International Telecommunication Union, Geneva, Switzerland.

"Draft revised G.709, version 3.4 for consent," Editor G.709, Sep. 28-Oct. 10, 2009, International Telecommunication Union, Geneva, Switzerland.

Lázarao et al., "Remotely Amplified SARDANA: Single-fibre-tree Advanced Ring-based Dense Access Network Architecture," European Conference on Optical Communication, Sep. 24-28, 2006, Cannes, France.

Marmur et al., "GPON: The Next Big Thing in Optical Access Networks, A Comparison of EPON, APON, and the Emerging GPON Technology," Apr. 1, 2003, FlexLight Networks, Pleasanton, California.

Nesset et al., "Demonstration of Enhanced Reach and Split of a GPON System Using Semiconductor Optical Amplifiers," European Conference on Optical Communication, Sep. 24-28, 2006, Cannes, France.

International Search Report in corresponding PCT Application No. PCT/CN2008/072070 (Nov. 27, 2008).

$1^{st}$ Office Action in corresponding Japanese Application No. 2010-522172 (Dec. 12, 2011).

\* cited by examiner

METHOD, SYSTEM AND DEVICE FOR PASSIVE OPTICAL NETWORK DATA TRANSMISSION

CROSS-REFERENCE TO RELATED APPLICATIONS

This application is a continuation of International Patent Application No. PCT/CN2008/072070, filed Aug. 20, 2008, which claims priority to Chinese Patent Application No. 200710145571.4, filed Aug. 28, 2007, both of which are hereby incorporated by reference in their entireties.

FIELD OF THE TECHNOLOGY

The present invention relates to a passive optical network (PON) technology, and more particularly to a method, a system, and a device for PON data transmission.

BACKGROUND OF THE INVENTION

Currently, as a broadband optical access technology, the PON is in a point-to-multipoint topology structure.

FIG. 1 is a network structural view of the PON. The PON includes an optical line terminal (OLT) 101, a passive optical distribution network (ODN) 102, and one or more optical network units (ONUs) 103. The OLT 101 is located in a central office, and provides wide area network interfaces upwards, including Gigabit Ethernet (GE), Asynchronous Transfer Mode (ATM), Digital Signal 3 (DS-3) (45 Mbit/s digital rate) interfaces. The ONU 103 is at the user side, and provides a 10/100 BaseT (fast Ethernet), a T1/E1 (T1: 1.5M digital rate, and E1: 2M digital rate, the DS-3, and other application interfaces for the user. The ODN 102 is composed of a branching device/a coupler, and other passive devices, and is connected to one OLT 101 and one or more ONU 103 passively. Upstream data and downstream data are borne by different wavelengths, the downstream data is sent in a broadcast mode, and the upstream data is accessed in a time division multiple access (TDMA) mode based on statistical multiplexing. Therefore, the PON has advantages of shared bandwidth resources, lower machine room investment, high equipment security, a high network construction speed, and low comprehensive networking cost.

With the development of broadband services, the PON technology is continuously evolved from an ATM PON (APON) and a broadband PON (BPON), to an Ethernet PON (EPON) and a Gigabit PON (GPON), and the transmission bandwidth is continuously increased. For a current GPON, the downstream rate is 2.5 Gbps or 1.25 Gbps, and an upstream rate includes various rates, for example, 2.5 Gbps, 1.5 Gbps, and 622 Mbps.

The GPON adopts a new transmission protocol GPON Encapsulation Method (GEM). The GEM originates from a generic framing concept of the Generic Framing Protocol (GFP); meanwhile, in consideration of the multi-ONU, and the multi-port multiplexing of the PON network, a port identity PORT-ID is introduced. Viewed from a service port of the ONU, the port has a point-to-point connection with the OLT, and is identified by the PORT-ID.

As for differences between the GEM and the GFP, the GFP is processed according to 8-bit bytes, a payload length indicator (PLI) of the GFP is 16 bits, and a PLI of the GEM is 12 bits, a head error control (HEC) of the GFP is 16 bits, and a cyclic redundancy code (CRC) of the GEM is 12 bits. Further, the GEM has the PORT-ID, and may be multiplexed or switched according to the PORT-ID, but the GFP does not have a link layer switching capability. In addition, the GEM is used only between the ONU and the OLT in the GPON, and the GFP is only applicable in the transmission network as the adaptation protocol of the transmission channel.

It can be seen from the above description that, the GEM is not only an adaptation protocol, but also a link layer protocol having a switching capability. The protocol may complete adapting the diversified services of the high layer, which includes an ATM service, a time division multiplex (TDM) service, and an Internet protocol (IP)/Ethernet service. The adaptation for the diversified services is efficient and transparent; meanwhile, the protocol supports the multiplexing, a dynamic bandwidth assignment (DBA), and other operation and management (OAM) schemes, which is suitable for encapsulating service data of the Ethernet, and is also suitable for encapsulating the service data of the TDM, and is one of the ideal solutions of the integrated service access.

A frame structure of the GPON has a cycle of 125 microseconds and has a frame synchronization area, a management overhead area, and a payload area. The downstream is successive signals, and the upstream is the TDMA mode. The OLT indicates each ONU upstream time slot in the downstream frame overhead, and each ONU sends a burst data packet according to a time slot position indicated by the downstream frame overhead.

FIG. 2 shows a structure of the GPON downstream frame. As shown in FIG. 2, one downstream frame in the GPON includes a Physical Control Block downstream (PCBd) overhead area and a payload area. An Upstream Bandwidth Map (US BW MAP) domain in the PCBd overhead area is adapted to assign the upstream bandwidth, and includes an upstream time slot indicator overhead indicating a start position and an end position of each ONU upstream time slot. A control object of the bandwidth assignment is a transmission container (T-CONT), the OLT may assign one or more T-CONTs for one ONU, which is a concept introduced in the PON DBA technology to improve an efficiency of the DBA. In FIG. 2, PLend indicates a payload length downstream.

FIG. 3 shows a structure of the upstream frame of the GPON. Each ONU respectively sends the upstream burst data packet to the OLT in the T-CONT assigned by the OLT, in which the upstream burst data packets include an overhead area and a payload area. The overhead area includes a Physical Layer Overhead upstream (PLOu) domain, an Upstream Physical Layer OAM upstream (PLOAMu) domain, a Physical Layer Sequence upstream (PLSu) domain for power adjustment, and a Dynamic Bandwidth Report upstream (DBRu) domain.

FIG. 4 shows a specific structure of the burst data packet sent by a single ONU. The PLOu domain is used for realizing the burst synchronization, and includes a Preamble, a Delimiter, a bit-interleaved parity (BIP) (bit-interleaved parity-8). After occupying the upstream channel, the ONU firstly sends the PLOu unit to the OLT, so that the OLT may be synchronous with the ONU rapidly, and correctly receives valid upstream data of the ONU. The PLOAMu domain is used for bearing the upstream PLOAM information, which includes an ONU ID, a Message ID, a Message, and a CRC.

Next, the GPON is taken for example to describe the working principles of the PON.

FIG. 5 is an application example of the GPON in data backhaul in the conventional art, and a data transmission procedure is described in the following by taking the Ethernet service data transmission as an example.

Downstream Direction

A service network 505 sends an Ethernet data frame to a transmission network 504 through an Ethernet interface.

The transmission network 504 supports the GFP adaptation protocol, encapsulates the Ethernet data frame through the GFP, adapts the GFP frame to a transmission channel, transmits the GFP frame to a corresponding transmission node, recovers the Ethernet data frame from the GFP frame, and transmits the recovered Ethernet data frame to the corresponding OLT 503.

The OLT 503 supports the GEM adaptation protocol, encapsulates the received Ethernet data frame into a GEM frame, maps a plurality of GEM frames to a payload area of a downstream frame, adds a PCBd overhead, in which a US BW MAP indicates an upstream bandwidth assigned for each ONU, and sends the downstream frame to the corresponding ONU.

The ONU 501 extracts the GEM frame from the payload area in the downstream frame, removes the encapsulation of the GEM, recovers the Ethernet data frame, and sends the recovered Ethernet data frame to each access user.

Upstream Direction

The ONU 501 firstly encapsulates the Ethernet data frame sent by the access user into a GEM frame, maps many GEM frames to the payload area of the upstream burst data packet, adds the upstream overhead, forms and encapsulates the upstream burst data packet into the T-CONT, and transmits the upstream burst data packet in an upstream line according to the upstream bandwidth assigned by the OLT 503.

The OLT 503 receives the T-CONT, extracts the upstream overhead, extracts the GEM frame of the payload area, removes the encapsulation of the GEM, and recovers the Ethernet data frame.

The OLT 503 sends the recovered Ethernet data frame to the transmission network 504 through the corresponding Ethernet port.

The transmission network 504 encapsulates the Ethernet data frame through the GFP, adapts the GFP frame into the transmission channel of the transmission network 504, transmits the GFP frame to the corresponding transmission node, decapsulates the GFP frame to recover the Ethernet data frame, and sends the backhaul of the GPON access data to the service network 505.

It can be known from the application examples that, although the PON has a large capacity, the transmission distance is short, the number of switching offices of the service network is limited, and the distances between the OLTs and the switching offices of the service network are different, so that most of the OLTs cannot be directly connected to the service network to implement the data backhaul, and the service data requires another transmission of the transmission network to reach the service network.

SUMMARY OF THE INVENTION

Accordingly, the present invention is directed to a system for PON data transmission, which is capable of directly transmitting PON service data to a service network.

The present invention is also directed to a method for PON data transmission, which is capable of directly transmitting PON service data to a service network.

The present invention is further directed to a method for PON data transmission, which is capable of receiving service data of other PON nodes and transmitting the service data to a service network.

The present invention is further directed to a method for PON data transmission, which is capable of directly transmitting PON service data to other PON nodes.

The present invention is further directed to a device for PON data transmission, which is capable of receiving service data of other devices and transmitting the service data to a service network.

The present invention is further directed to a device for PON data transmission, which is capable of directly transmitting PON service data to devices.

In an embodiment, the present invention provides a system for PON data transmission, which includes at least one first ONU, a service network, a central office OLT (S-OLT), and a local OLT (L-OLT).

The S-OLT and the L-OLT are connected through a transmission link to form a transmission network.

The S-OLT is adapted to receive service data sent by the service network, and send the service data to the L-OLT through a transmission channel of the transmission network; and receive service data sent by the L-OLT from the transmission channel of the transmission network, and send the service data to the service network.

The L-OLT is adapted to receive the service data sent by the S-OLT from the transmission channel of the transmission network, and send the service data to the first ONU; and receive service data sent by the first ONU, and send the service data to the S-OLT through the transmission channel of the transmission network.

In another embodiment, the present invention provides a method for PON data transmission, which includes the following steps.

An S-OLT and an L-OLT are connected through a transmission link to form a transmission network.

The L-OLT receives service data sent by a first ONU of each ONU, and transmits the service data to the S-OLT through a transmission channel of the transmission network.

The S-OLT receives the service data sent by the L-OLT from the transmission channel of the transmission network, and sends the service data to the service network.

The S-OLT receives service data sent by the service network, and sends the service data to the L-OLT through the transmission channel of the transmission network.

The L-OLT receives the service data sent by the S-OLT from the transmission channel of the transmission network, and sends the service data to the first ONU.

In another embodiment, the present invention provides a method for PON data transmission, which includes the following steps.

An S-OLT and an L-OLT are connected through a transmission link.

The S-OLT receives service data sent by the L-OLT from a transmission channel of the transmission network, and sends the service data to a service network.

The S-OLT receives service data sent by the service network, and sends the service data to the L-OLT through the transmission channel of the transmission network.

In another embodiment, the present invention provides a method for PON data transmission, which includes the following steps.

An L-OLT and an S-OLT are connected through a transmission link.

The L-OLT receives service data sent by each ONU, and transmits the service data to the S-OLT through a transmission channel of the transmission network.

The L-OLT receives the service data sent by the S-OLT from the transmission channel of the transmission network, and sends the service data to the ONU through a GPON downstream frame.

In addition, in another embodiment, the present invention further provides a device for PON data transmission, which includes a service adaptation module, a channel adaptation module, a line interface module, and a master control module.

The service adaptation module is adapted to receive service data sent by the channel adaptation module, send the service data to a service network, and send the service data sent by the service network to the channel adaptation module according to destination address information thereof.

The line interface module is connected to a transmission link.

The channel adaptation module is adapted to adapt the service data from the service adaptation module to a transmission channel, and send the transmission channel to the line interface module; and extract the service data from the transmission channel received by the line interface module, and send the service data to the service adaptation module.

The master control module is adapted to control the modules.

In another embodiment, the present invention further provides another device for PON data transmission, which includes a PON tributary module, a channel adaptation module, a line interface module, and a master control module.

The PON tributary module is adapted to receive an upstream frame from a PON tributary, extract service data in the upstream frame, and send the service data to the channel adaptation module; and encapsulate service data from the channel adaptation module into a PON downstream frame, and send the PON downstream frame to the PON tributary.

The line interface module is connected to a transmission link.

The channel adaptation module is adapted to adapt the service data from the PON tributary module to a transmission channel, and send the transmission channel to the line interface module; and extract the service data from the transmission channel received by the line interface module, and send the service data to the PON tributary module.

The master control module is adapted to control the modules.

It can be known from the technical solutions that in the system for PON data transmission according to an embodiment of the present invention, the S-OLT and the L-OLT are connected through the transmission link, so that the S-OLT directly sends the service data of the L-OLT to the service network.

In the method for PON data transmission according to an embodiment of the present invention, the S-OLT and the L-OLT are connected through the transmission link, so that the L-OLT sends the service data to the S-OLT, and the S-OLT directly sends the received service data of the L-OLT to the service network.

In the method for PON data transmission according to an embodiment of the present invention, the S-OLT and the L-OLT are connected, so that the S-OLT directly sends the service data of the L-OLT to the service network.

In the method for PON data transmission according to an embodiment of the present invention, the L-OLT and the S-OLT are connected, so that the S-OLT directly sends the service data of the L-OLT to the service network.

The device for PON data transmission according to an embodiment of the present invention has functions of a PON network and functions of a transmission network, and is capable of directly sending the PON service data to the service network.

Another device for PON data transmission according to an embodiment of the present invention has functions of a PON network and functions of a transmission network, and is capable of sending the PON service data to other nodes through the transmission link.

DETAILED DESCRIPTION OF THE EMBODIMENTS

In order to make the objectives, technical solutions, and advantages of the present invention more comprehensible, the present invention is further described in detail below with reference to embodiments and the accompanying drawings.

OLT devices according to the embodiments of the present invention include two types, namely, a super-OLT (S-OLT) and a local OLT (L-OLT). The S-OLT is usually disposed in a central office, and is also called a central office OLT. The S-OLT and the L-OLT are connected through a transmission link to form a transmission network. The OLT directly connected to a service network in the transmission network is set to be the central office OLT (S-OLT), and other OLTs relatively far from the service network are set to be the L-OLTs. Service data of the L-OLT is sent to the S-OLT through the transmission link, and is sent to the service network by the S-OLT.

Figure 6:
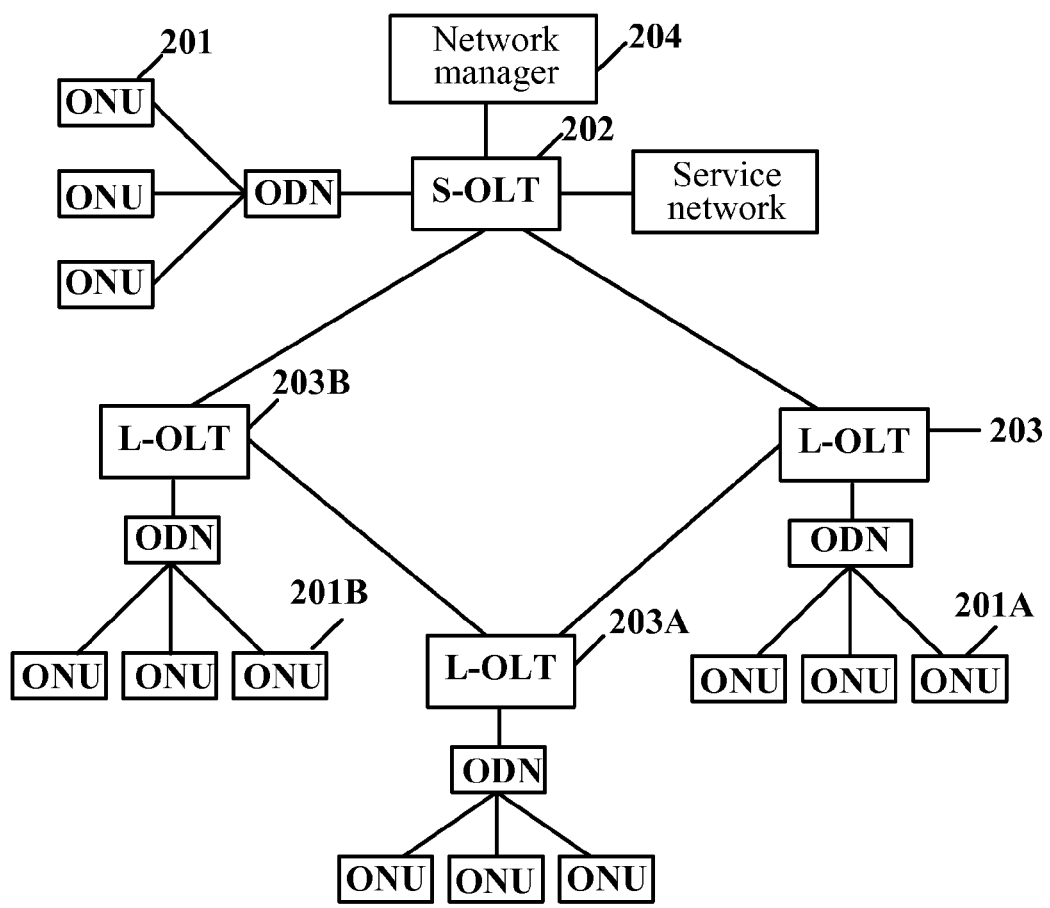
FIG. 6 is a structural view of a system for GPON data transmission according to an embodiment of the present invention.

Referring to FIG. 6, in an embodiment, the present invention provides a system for PON data transmission, which is connected to a service network, and includes at least one first ONU (201), an S-OLT (202), and an L-OLT (203).

The S-OLT (202) and the L-OLT (203) are connected through a transmission link to form a transmission network.

The S-OLT (202) is adapted to receive service data sent by the service network, and send the service data to the L-OLT (203) through a transmission channel of the transmission network; and receive the service data sent by the L-OLT (203) from the transmission channel of the transmission network, and send the service data to the service network.

The L-OLT (203) is adapted to receive the service data sent by the S-OLT (202) from the transmission channel of the transmission network, and send the service data to a first ONU (201A); and receive the service data sent by the first ONU (201A), and send the service data to the S-OLT (202) through the transmission channel of the transmission network.

Further, the system includes at least one second ONU (201B), and the S-OLT (202) is further adapted to send the service data sent by the service network to the second ONU (201B), and send the service data sent by the second ONU (201B) to the service network.

Further, the system includes at least one second ONU (201B).

The S-OLT (202) is further adapted to send the service data sent by the L-OLT (203) to the second ONU (201B); and send the service data sent by the second ONU (201B) to the L-OLT (203) through the transmission channel of the transmission network.

The S-OLT (202) is further adapted to send the service data sent by the first L-OLT (203A) to a second L-OLT (203B) through the transmission channel of the transmission network.

The S-OLT (202) is further adapted to detect a traffic flow from the service network and/or classify service flows, and assign the transmission channels according to a detection result and/or classification information.

The L-OLT (203) is further adapted to send status information of a PON tributary and status information of the transmission channel of the transmission network to the S-OLT (202) through an agreed communication channel; and receive management information from the agreed communication channel, and configure the local transmission channel and the PON tributary according to the management information.

The S-OLT (202) is further adapted to generate the management information for the transmission channel and/or the PON tributary according to the status information sent by the L-OLT (203) and received from the agreed communication channel, and send the management information to the L-OLT (203) through the agreed communication channel.

The system according to the embodiment of the present invention further includes a network manager (204).

The network manager (204) is connected to the S-OLT (202), and is adapted to configure the transmission channel of the transmission network and each PON tributary. The S-OLT (202) is further adapted to detect a traffic flow from the service network and/or classify service flows, and send a detection result and/or classification information to the network manager (204).

The network manager (204) assigns the transmission channels according to the detection result and/or the classification information sent by the S-OLT (202).

The system according to the embodiment of the present invention further includes a network manager (204).

The network manager (204) is connected to the S-OLT (202), and is adapted to generate management information for configuring the transmission channel and/or the PON tributary according to the received status information of the transmission channel of the transmission network and/or of the PON tributary, and send the generated management information to the S-OLT (202).

The L-OLT (203) is further adapted to send the status information of the PON tributary and/or the status information of the transmission channel of the transmission network to the S-OLT (202) through an agreed communication channel; and receive the management information from the agreed communication channel, and configure the PON tributary and/or the local transmission channel according to the management information.

The S-OLT (202) is further adapted to send the status information received from the L-OLT (203) to the network manager (204); and configure the local transmission channel and/or the PON tributary according to the management information sent by the network manager (204), and send the management information for the L-OLT (203) to the L-OLT (203) through the agreed communication channel.

The L-OLT (203) is adapted to send the status information of the PON tributary to the S-OLT (202) through a Data Communication Channel (DCC) of a Synchronous Digital Hierarchy (SDH)/a Synchronous Optical Network (SONET), a monitoring channel of Wavelength Division Multiplexing (WDM), or a transmission channel of a GEM frame; and receive the management information from the DCC channel of the SDH/SONET, the monitoring channel of the WDM, or the transmission channel of the GEM frame.

The S-OLT (202) is adapted to receive the status information sent by the L-OLT from the DCC channel of the SDH/SONET, the monitoring channel of the WDM, or the transmission channel of the GEM frame; and send the management information to the L-OLT (203) through the DCC channel of the SDH/SONET, the monitoring channel of the WDM, or the transmission channel of the GEM frame.

In the system according to the embodiment of the present invention, the S-OLT (202) is further adapted to encapsulate the service data sent by the service network into a GEM frame in a GPON network, and adapt the GEM frame to the transmission channel; and decapsulate the GEM frame sent by the L-OLT (203) and received from the transmission channel of the transmission network to obtain the service data.

The L-OLT (203) is further adapted to adapt the GEM frame from the first ONU (201A) to the transmission channel, and send the GEM frame to the S-OLT (202) through the transmission network.

The S-OLT (202) is further adapted to select the transmission channel for adapting the GEM frame according to service types before adapting the GEM frame to the transmission channel, and directly map the GEM frame of the emergent service or the service having a higher demand for real-time performance to the designated transmission channel; and/or The L-OLT (203) is further adapted to select the transmission channel for adapting the GEM frame according to the service types before adapting the GEM frame to the transmission channel, and directly map the GEM frame of the emergent service or the service having a higher demand for real-time performance to the designated transmission channel.

The transmission network is an SDH/SONET transmission network, the transmission channel is a virtual container (VC), a virtual tributary (VT), or an STS-1 of the SDH/SONET, and the transmission link is a synchronous transmission module (STM-n)/an optical carrier (OC-n) link; or The transmission network is an optical transport network (OTN), the transmission channel is an optical channel data unit (ODUk), and the transmission link is an optical transmission module (OTM).

The transmission network is a WDM network, the transmission channel is a wavelength, and the transmission link is an optical fiber.

Figure 7:
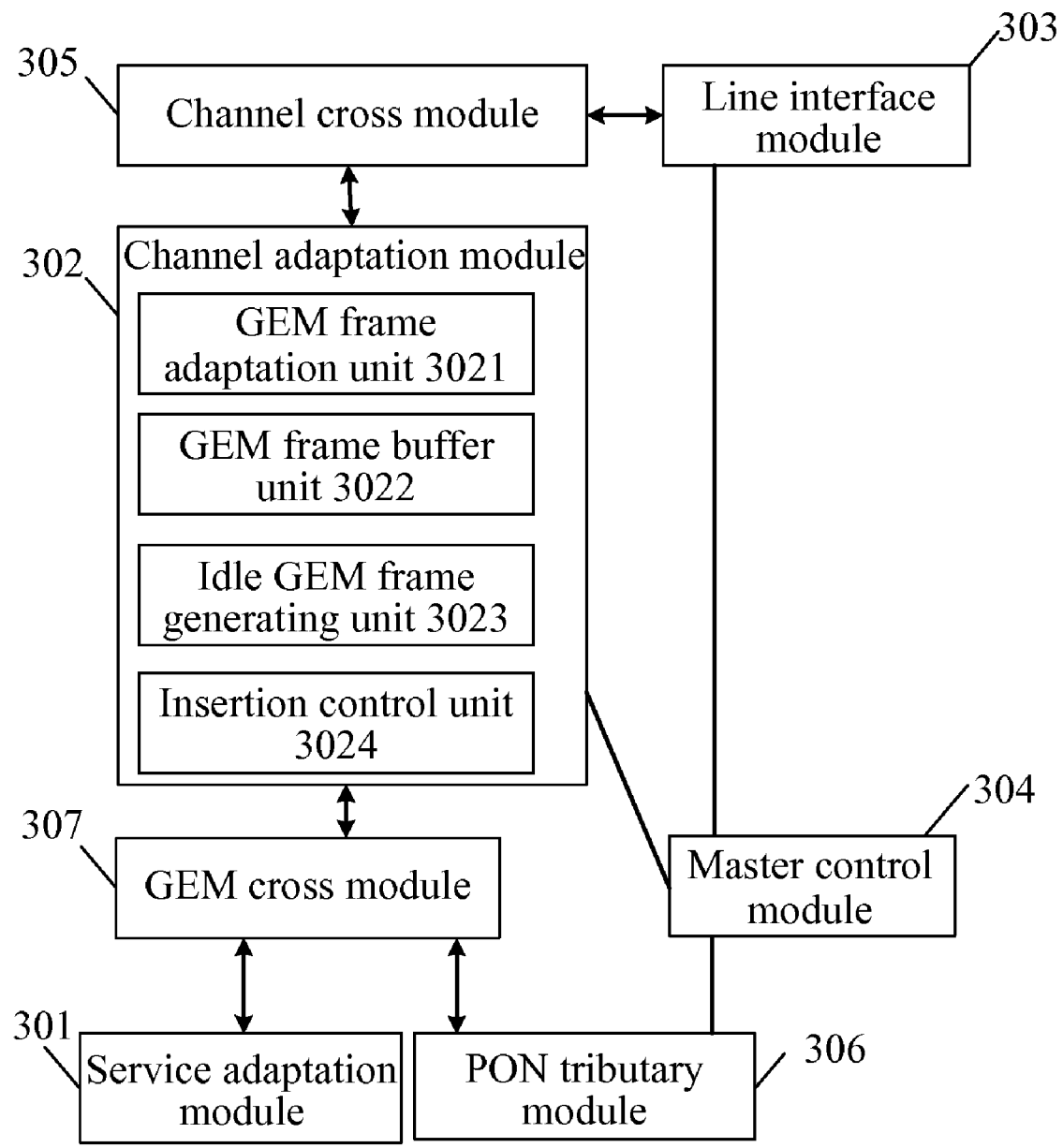
FIG. 7 is a schematic view of a device for PON data transmission according to an embodiment of the present invention.

Referring to FIG. 7, in an embodiment, the present invention also provides a device for PON data transmission, which includes a service adaptation module (301), a channel adaptation module (302), a line interface module (303), and a master control module (304).

The line interface module (303) is connected to a transmission link, and is adapted to connect to other devices for PON data transmission to form a transmission network.

The service adaptation module (301) is adapted to receive service data sent by the service network, send the service data to the channel adaptation module (302); and receive the service data sent by the channel adaptation module (302), and send the service data to the service network.

The channel adaptation module (302) is adapted to adapt the service data from the service adaptation module (301) into a transmission channel, and send the transmission channel to the line interface module (303); and extract the service data from the transmission channel received by the line interface module (303), and send the service data to the service adaptation module (301).

The master control module (304) is adapted to control the service adaptation module (301), the channel adaptation module (302), and the line interface module (303).

Further, the device for PON data transmission according to the embodiment of the present invention further includes a channel cross module (305).

The channel cross module (305) is adapted to, when being connected to the line interface module (303), send a signal to the line interface module (303) or receive a signal from the line interface module (303); and the channel cross module 305 is adapted to, when being connected to the channel adaptation module (302), dispatch the transmission channel.

The service adaptation module (301) is adapted to encapsulate the service data from the service network into a GEM frame, and send the GEM frame to the channel adaptation module (302); and receive the GEM frame sent by the channel adaptation module (302), decapsulate the GEM frame to obtain the service data, and send the service data to the service network.

The channel adaptation module (302) is adapted to adapt the GEM frame from the service adaptation module (301) into the transmission channel, and send the transmission channel to the line interface module (303); and extract the GEM frame from the transmission channel received by the line interface module (303), and send the GEM frame to a PON tributary module (306) or the service adaptation module (301).

The device for PON data transmission according to the embodiment of the present invention further includes a PON tributary module (306).

The PON tributary module (306) is adapted to receive the service data sent by each ONU on the PON tributary, and send the service data to the channel adaptation module (302); and send the service data from the channel adaptation module (302) to each ONU.

The service adaptation module (301) is adapted to send the service data from the service network to the PON tributary module (306).

The channel adaptation module (302) is adapted to adapt the service data from the PON tributary module (306) to the transmission channel, and send the transmission channel to the line interface module (303).

The device for PON data transmission according to the embodiment of the present invention further includes a PON tributary module (306).

The PON tributary module (306) is adapted to extract the GEM frame sent by each ONU from a GPON upstream frame, and send the GEM frame to the channel adaptation module (302); and encapsulate the GEM frame from the channel adaptation module (302) into a GPON downstream frame, and send the GPON downstream frame to each ONU.

The service adaptation module (301) is adapted to encapsulate the service data from the service network into the GEM frame, and send the GEM frame to the PON tributary module (306).

The channel adaptation module (302) is adapted to adapt the GEM frame from the PON tributary module (306) into the transmission channel, and send the transmission channel to the line interface module (303).

Further, the device includes a GEM cross module (307).

The GEM cross module (307) is adapted to switch the GEM frame sent by the service adaptation module (301) to the PON tributary module (306) or the channel adaptation module (302); and switch the GEM frame sent by the channel adaptation module (302) to the PON tributary module (306) or the service adaptation module (301).

The GEM cross module (307) is further adapted to switch the GEM frame from the PON tributary module (306) and the GEM frame from the channel adaptation module (302), or multiplex the GEM frame to the transmission channel.

The service adaptation module (301) is adapted to further add IDs of a target ONU of the frame and the OLT and/or an optical distribution network (ODN) to a frame header of the GEM frame according to destination address information thereof when encapsulating the service data from the service network into the GEM frame, and send the GEM frame to the channel adaptation module (302) or the PON tributary module (306).

The PON tributary module (306) is adapted to extract the GEM frame from the received upstream frame of the PON tributary, add the IDs of the ONU generating the frame and the OLT and/or the ODN to the frame header of the GEM frame, and send the GEM frame to the channel adaptation module (302).

The GEM cross module (307) is adapted to switch and multiplex the GEM frame according to the IDs in the frame header of the GEM frame.

The channel adaptation module (302) further includes a GEM frame adaptation unit (3021), a GEM frame buffer unit (3022), an idle GEM frame generating unit (3023), and an insertion control unit (3024).

The GEM frame buffer unit (3022) is adapted to receive the GEM frame sent from outside to the channel adaptation module (302), save the GEM frame in a buffer, and output the GEM frame from the buffer under the control of the insertion control unit (3024).

The idle GEM frame generating unit (3023) is adapted to generate an idle GEM frame, and the idle GEM frame is a frame header of the GEM frame without a payload area.

The insertion control unit (3024) is adapted to detect the status of the buffer in the GEM frame buffer unit, and if the buffer is null, control the GEM frame adaptation unit (3021) to read one idle GEM frame from the idle GEM frame generating unit (3023), and adapt the idle GEM frame to the transmission channel, or control the GEM frame buffer unit (3022) to output one GEM frame if the buffer is not null.

The GEM frame adaptation unit (3021) is adapted to adapt the GEM frame to the transmission channel.

The master control module (304) is further adapted to obtain status information of each ONU from the data received by the PON tributary module (306), and/or obtain status information of the transmission channel from the channel adaptation module (302), and send the status information to a network manager; and receive management information sent by the network manager, and manage the modules according to the management information.

The status information sent by the PON tributary module (306) to the master control module (304) includes DBA requests sent by all the ONUs on the PON tributary.

The management information sent by the master control module (304) and received by the PON tributary module (306) includes US BW MAP configuration information of the PON tributary.

The master control module (304) is further adapted to receive the status information sent by the service adaptation module (301), and send the status information to the network manager; and receive the management information sent by the network manager, and send the management information to the service adaptation module (301).

The service adaptation module (301) is further adapted to encapsulate the management information sent by the master control module (304) into the GEM frame, identify the frame by using a payload type indicator (PTI) field of a frame header of the GEM frame, and send the GEM frame to the channel adaptation module (302); and extract the management information from the received GEM frame, and send the management information to the master control module (304).

The master control module (304) is further adapted to perform traffic monitoring on downstream service data or on upstream service data, obtain a monitoring result, and send the monitoring result to the network manager; and receive the management information for configuring a capacity of the transmission channel from the network manager, and configure the capacity of the local transmission channel according to the information.

Figure 8:
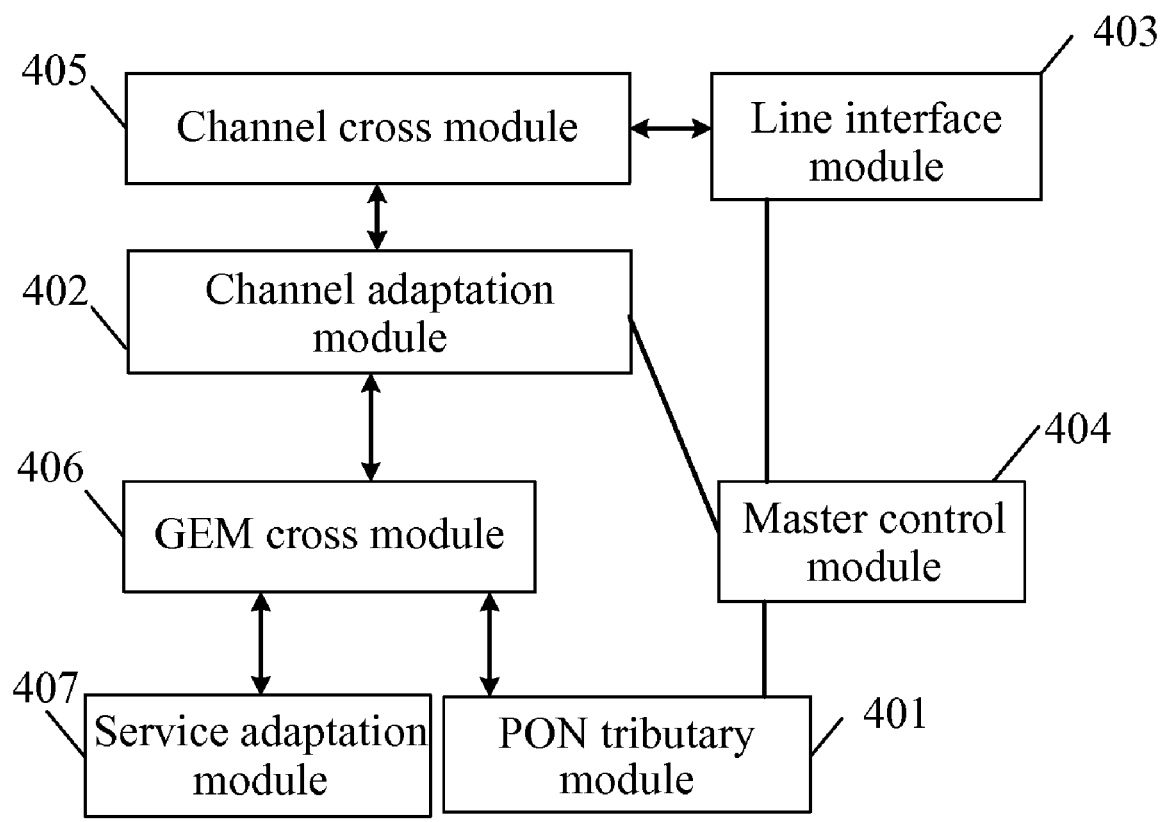
FIG. 8 is a schematic view of another device for PON data transmission according to an embodiment of the present invention.

Referring to FIG. 8, in an embodiment, the present invention further provides a device for PON data transmission, which includes a PON tributary module (401), a channel adaptation module (402), a line interface module (403), and a master control module (404).

The PON tributary module (401) is adapted to receive service data from each ONU on the PON tributary, and send the service data to the channel adaptation module (402); and send the service data from the channel adaptation module (402) to each ONU on the PON tributary.

The line interface module (403) is connected to a transmission link, and is adapted to connect to other devices for PON data transmission to form a transmission network.

The channel adaptation module (402) is adapted to adapt the service data from the PON tributary module (401) into a transmission channel, and send the transmission channel to the line interface module (403); and extract the service data from the transmission channel received by the line interface module (403), and send the service data to the PON tributary module (401).

The master control module (404) is adapted to control the PON tributary module (401), the channel adaptation module (402), and the line interface module (403).

The device further includes a channel cross module (405).

The channel cross module (405) is adapted to, when being connected to the line interface module (403), send a signal to the line interface module (403) or receive a signal from the line interface module (403); and the channel cross module (405) is adapted to, when being connected to the channel adaptation module (402), dispatch the transmission channel.

The channel adaptation module (402) is adapted to adapt a GEM frame from the PON tributary module (401) to the transmission channel, and send the transmission channel to the line interface module (403); and extract the GEM frame from the transmission channel received by the line interface module (403), and send the GEM frame to the PON tributary module (401).

The PON tributary module (401) is adapted to extract the GEM frame sent by each ONU on the PON tributary from a GPON upstream frame, and send the GEM frame to the channel adaptation module (402); and encapsulate the GEM frame from the channel adaptation module (402) into a GPON downstream frame, and send the GPON downstream frame to each ONU.

The device further includes a GEM cross module (406).

The GEM cross module (406) is adapted to switch the GEM frame sent by a service adaptation module (407) to the PON tributary module (401) or the channel adaptation module (402); and switch the GEM frame sent by the channel adaptation module (402) to the PON tributary module (401) or the service adaptation module (407).

The GEM cross module (406) is further adapted to switch the GEM frame from the PON tributary module (401) and the GEM frame from the channel adaptation module (402), or multiplex the GEM frame to the transmission channel.

In order to describe the technical solutions of the embodiments of the present invention in detail, the following embodiments are given.

First Embodiment

In this embodiment, an S-OLT and a plurality of L-OLTs are connected to form a ring network by applying an SDH which is mature on the current market in a GPON network. The mature survivability technology of the SDH ring network also brings higher network reliability to the system for PON data transmission according to this embodiment.

Figure 9:
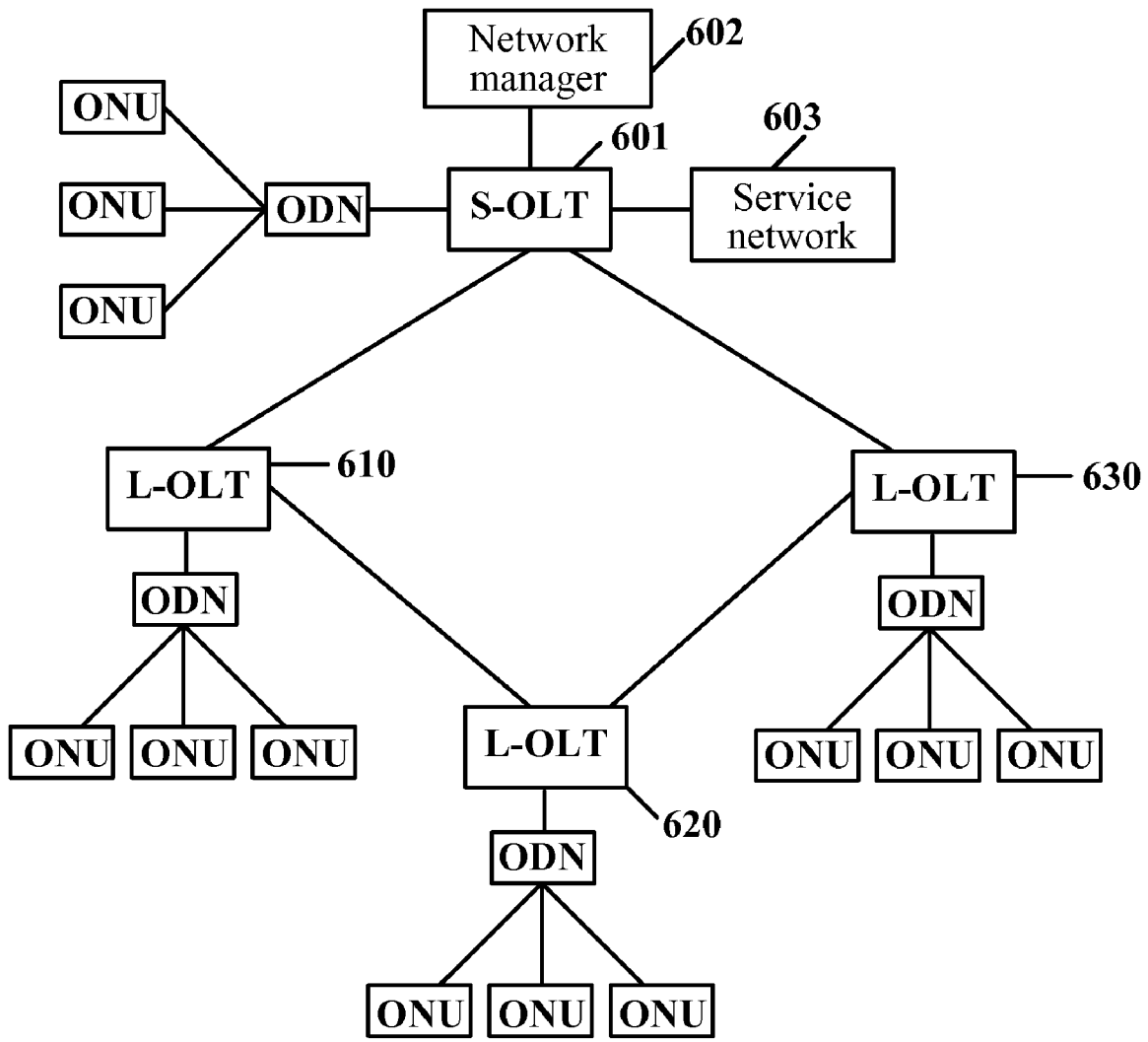
FIG. 9 is a structural view of a system for GPON data transmission according to a first embodiment of the present invention.

FIG. 9 is a network structural view of the system for GPON data transmission according to this embodiment.

The system shown in FIG. 9 includes an S-OLT 601 directly connected to a service network 603, a plurality of L-OLTs, a network manager 602, and PON tributaries composed of PON tributary ODNs and ONUs connected thereto.

The PON system in the conventional art does not involve the concept of the PON tributary. The existing PON network only has a single OLT, a ODN connected thereto, and a plurality of ONUs, so that after the S-OLT and the plurality of L-OLTs are connected to form a large PON network, each L-OLT is connected to the ODN and the ONUs, and the S-OLT may also be connected to the ODN and the ONUs. For ease of description, one ODN and the plurality of ONUs connected thereto are called a PON tributary.

Figure 1:
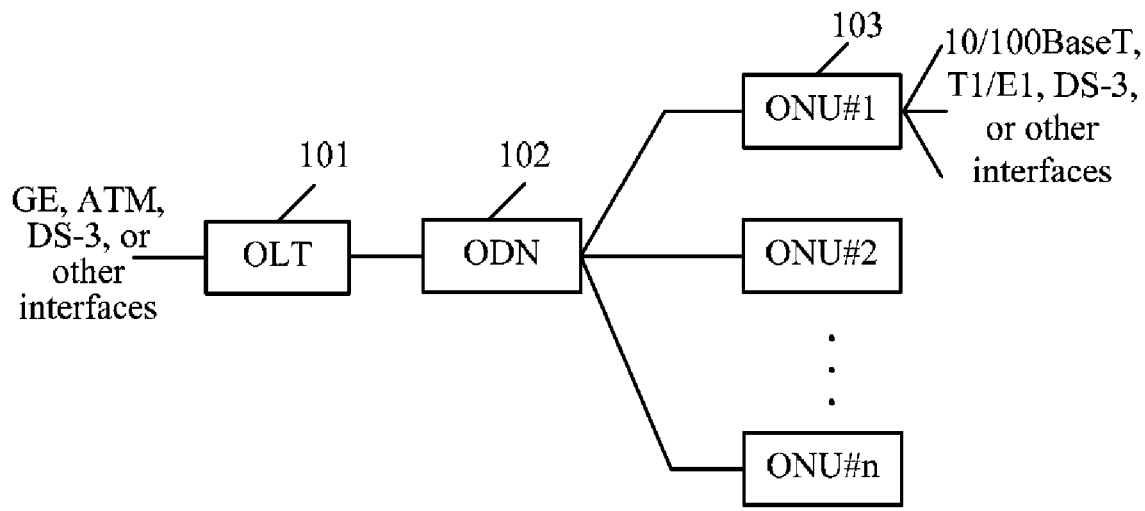
FIG. 1 is a schematic structural view of a PON network.
Figure 2:
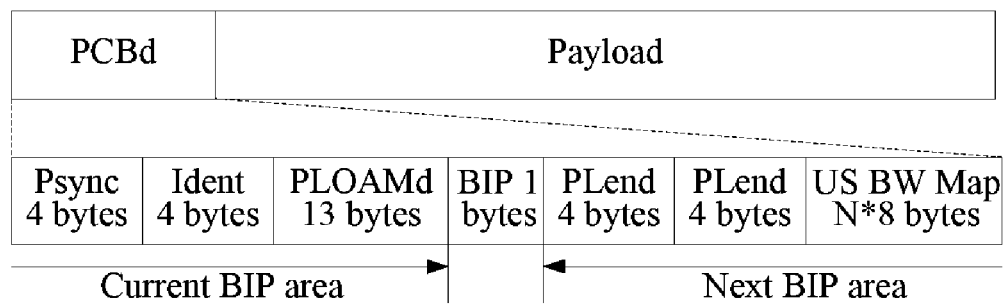
FIG. 2 is a structural view of a GPON downstream frame.
Figure 3:
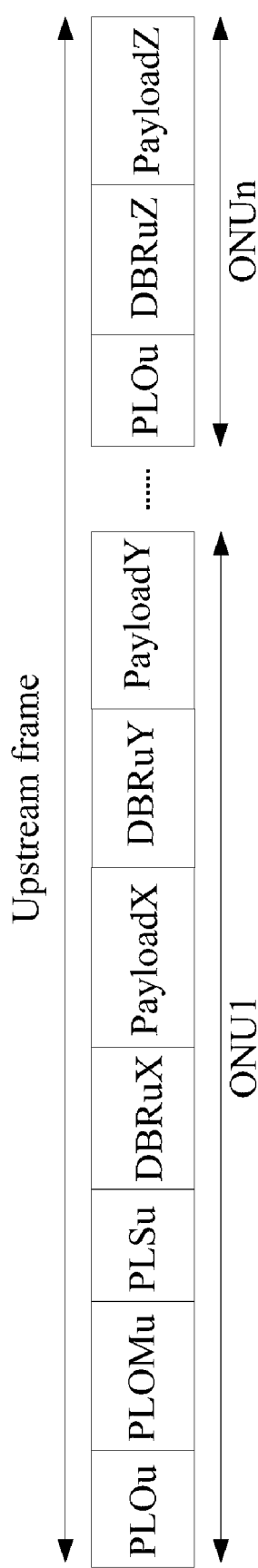
FIG. 3 is a structural view of a GPON upstream frame.
Figure 4:
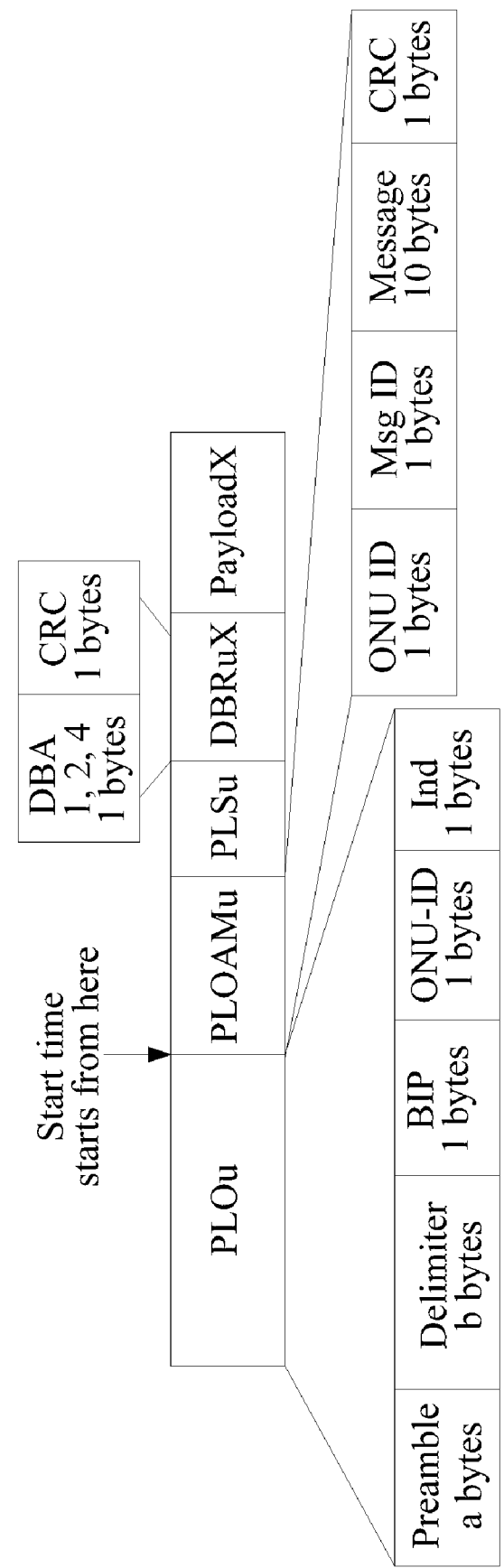
FIG. 4 is a structural view of an upstream burst data packet.
Figure 5:
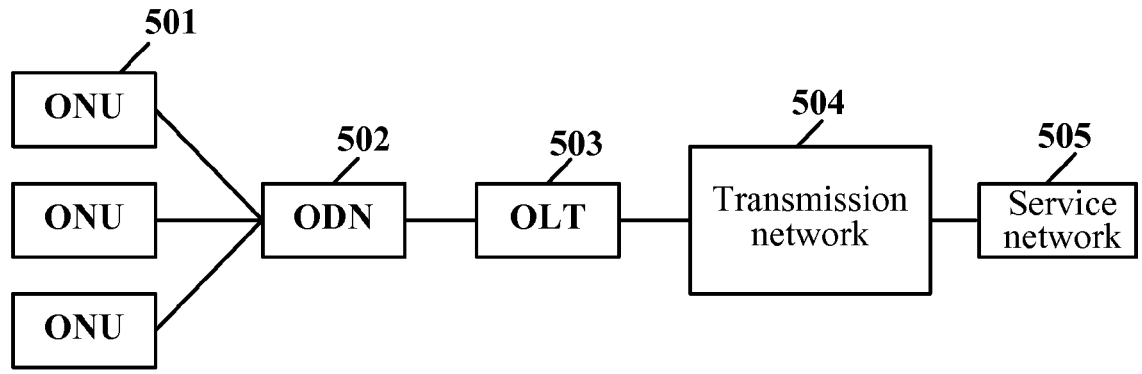
FIG. 5 is a schematic view of an application of the GPON network in user data backhaul in the conventional art.

In the system as shown in FIG. 3, the S-OLT 601 and the L-OLT 610, the L-OLT 620, and the L-OLT 630 are connected in sequence through optical fiber links, so as to form the ring transmission network. The network manager 602 is connected to the S-OLT 601, and is adapted to manage the S-OLT 601, a network unit formed by each L-OLT and the PON tributary connected thereto, and a transmission channel. A process of transmitting service data is described in the following.

Downstream Direction

A service network 606 sends service data to the service network 603.

The service network 603 sends the service data to the S-OLT 601.

The S-OLT 601 receives the service data sent by the service network 603.

For the service data to be sent to the local ONU, the S-OLT 601 adapts and encapsulates the corresponding service data into a GEM frame, switches the GEM frame to the PON tributary, encapsulates the GEM frame into a GPON downstream frame, and sends the GPON downstream frame to an interface of the local ODN. The local ONU extracts the GEM frame from a payload area of the downstream frame, removes the encapsulation of the GEM, recovers the service data, and sends the service data to a corresponding access user.

For the service data to be sent to the L-OLT, the S-OLT 601 adapts and encapsulates the corresponding service data into the GEM frame, maps the GEM frame to the transmission channel, for example, a VC in the SDH technology or the Virtual Tributary (VT) in the SONET technology, and then switches the transmission channel to a line interface of the transmission network, and sends the transmission channel to the transmission network through the line interface.

Each L-OLT receives, from the line interface of the transmission network, a signal from the S-OLT, de-maps the GEM frame from the transmission channel assigned by the network manager 602 for the L-OLT, and switches the GEM frame to the PON tributary of the L-OLT.

The ONU on the PON tributary obtains the GEM frame from the payload area of the downstream frame, removes the encapsulation of the GEM, recovers the service data, and sends the service data to the access user.

Upstream Direction

Each ONU adapts and encapsulates the service data of the access user into the GEM frame, adds an upstream overhead to the plurality of GEM frames to form a GPON upstream frame, and sends the GPON upstream frame to the L-OLT at an upstream time slot assigned by the L-OLT.

The L-OLT receives the upstream frame, recovers the GEM frame, adapts the GEM frame to the transmission channel assigned by the network manager 602, and transmits the GEM frame to the S-OLT 601 through the line interface.

The S-OLT 601 receives the signal from the line interface, de-maps the GEM frame from the corresponding transmission channel, removes the encapsulation of the GEM, recovers the service data, and sends the service data to the service network 603.

The service network 603 sends the service data to the service network 606.

The S-OLT is further adapted to detect a traffic flow from the service network and/or classify service flows, and assign a downstream transmission channel according to a detection result and/or classification information.

The L-OLT is further adapted to send status information of a PON tributary and/or status information of the transmission channel of the transmission network to the S-OLT through an agreed communication channel, receive management information from the agreed communication channel, and configure the local transmission channel and the PON tributary according to the management information. The S-OLT is further adapted to generate the management information for the transmission channel and/or the PON tributary according to the status information sent by the L-OLT, and send the management information to the L-OLT through the agreed communication channel.

The agreed communication channel may be a DCC channel of the SDH/SONET, a monitoring channel of WDM, or a transmission channel of the GEM frame. A certain channel of the DCC channel of the SDH/SONET or the monitoring channel of the WDM may be pre-configured to be a dedicated channel for the management information and the status information, or the management information and the status information may be encapsulated into the GEM frame, and are identified by standby values of a PTI field of a frame header of the GEM frame.

The network manager 602 is a unified network management device integrating a network manager of the transmission network and a network manager of the PON, has capabilities of managing the transmission network and managing the PON tributary, and is particularly capable of configuring the channel of the transmission network by analyzing the traffic of each PON tributary and other status information, and adjusting the assignment of the channel capacity of the transmission network.

The network manager 602 is connected to the S-OLT 601. Each L-OLT sends the status information of the PON tributary thereof (for example, a DBA request of the ONU) and the status information of the transmission channel to the S-OLT 601 through the DCC channel of the SDH or other agreed communication channels. The S-OLT 601 sends the status information of the local transmission channel and the PON tributary and the status information received from the L-OLT to the network manager 602, so that the network manager 602 assigns the transmission channel.

In this embodiment, in the ring transmission network, the SDH technology is adopted as the transmission technology, the VC in the SDH is used as the transmission channel; optionally, a SDH virtual concatenation technology may be adopted, so that the bandwidth assignment becomes more flexible, thereby improving a bandwidth utilization. When the virtual concatenation technology is adopted, the network manager 602 may adjust the transmission channel according to a dynamic change of the traffic flow. The method is as follows.

1) In the downstream direction, a required size of the transmission channel is calculated by monitoring a traffic of an service inlet port, in which the calculation may be completed by the network manager 602. The network manager 602 assigns the capacity of the transmission channel according to a calculation result, for example, controls a link capacity adjustment scheme (LCAS) module to adjust the capacity of the virtual concatenation group according to the calculation result, so that the bandwidth utilization of the channel layer is improved, and it is helpful for other service ports to utilize the released transmission channel. Further, the bandwidth may be adjusted according to the volume and priority the service.

2) In the upstream direction, the traffic of the GEM switch module port in the L-OLT is monitored, and the required bandwidth of the transmission channel is calculated according to the traffic. Alternatively, the required bandwidth of the transmission channel is calculated according to a US BW MAP carried in the downstream frame of each L-OLT. Alternatively, the transmission bandwidth may also be calculated according to the DBA request of the ONU. Alternatively, the time slot assigned for the upstream of the PON tributary is used as a flow, and the connection of the transmission channel is established according to the size of the flow. The establishing procedure is still completed by the network manager 602. The traffic data or the DBA request may be transferred from each L-OLT to the network manager 602 through the communication channel, for example, the DCC channel of the SDH, so as to calculate and adjust the capacity of the virtual concatenation group. Further, the upstream data of all the ONUs may be used as a flow, or a T-CONT time slot of the ONU having a high priority is used as a flow, or a PORT-ID of the ONU having a high priority is used as a flow. When the capacity of the transmission channel is adjusted according to the T-CONT flow of the ONU, the DBA request of the ONU is directly corresponding to the transmission bandwidth. As the S-OLT 601 obtains the DBA request of each tributary of each L-OLT, the network manager 602 can obtain the US BW MAP of each PON tributary on the network, and obtain the size of the transmission channel to be configured.

For the real-time or emergency service, the S-OLT/L-OLT maps the GEM frame to the pre-configured specific transmission channel, an intermediate L-OLT node on the channel does not perform any processing on the signal on the channel, so that the signal directly reaches a destination L-OLT node. For the switch of the service data between the ONUs of different L-OLTs, for example, the ONUs of the L-OLT 610 and the L-OLT 630, a transmission channel between the L-OLT 610 and the L-OLT 630 is pre-configured, and then the ports of the ONUs to be switched are connected to the pre-configured transmission channel through a GEM switch matrix, so as to realize the point-to-point communication or a private line connection between the ports of the ONUs of the different L-OLTs.

The S-OLT 601 is further adapted to detect the traffic flow from the service network and/or classify the service flows, for example, classify the service flows according to the priority of the service, and send the detection result and/or the classification information to the network manager. The network manager 602 assigns the transmission channel according to the detection result and/or the classification information sent by the S-OLT 601.

In this embodiment, the GEM is not only used as an adaptation protocol of the transmission channel, but also as a data transmission entity between the OLTs, so as to realize a peer to peer service between any ports of any ONUs on the ring. In addition, after being directly adapted to the GEM frame, an Ethernet private line service and other data private line services among the L-OLTs may be transmitted to the destination ONUs through the transmission channel.

The SDH network needs synchronization. Here, the downstream timing of the PON tributary may track timing of the VC channel or the SDH line, and the upstream timing of the PON tributary may track the downstream timing of the PON tributary.

The number of the nodes on the ring network in this embodiment is not limited to FIG. 9, and the following calculation method may be adopted. If an SDH line having a rate of 10 G is selected, a downstream data rate of the PON tributary may be selected to be 1.25 G or 2.5 G When the downstream rate of 1.25 G is selected, a 10 G ring network includes 8 L-OLTs at the utmost. If the transmission channel is planned according to the service classification, for example, for a broadcast service, all the L-OLTs may share the downstream channel, and other services are adjusted according to the dynamic bandwidth, thus greatly saving the downstream channel, so that the ring network may include more than eight L-OLTs.

In this embodiment, the mature SDH transmission network technology is selected as the transmission technology among the OLTs, so that the survivability of the ring network in this embodiment may be realized by the functions of the SDH ring network, for example, a multiplex section protection of the SDH.

The transmission channel not only adopts the VC channel of the SDH, but also adopts the VT channel of the SONET, an ODUk of the OTN, a wavelength channel of a pure optical network, a DTM time slot channel, a VPI channel of the ATM, or other time slot channels having a fixed size frame format.

It can be known from the above description that, in this embodiment, the existing OLT devices are correspondingly changed to realize the above functions, the S-OLT and the L-OLTs combine the functions of the PON and the functions of the transmission nodes in the transmission network. A functional structure of the S-OLT is as shown in FIG. 10.

Figure 10:
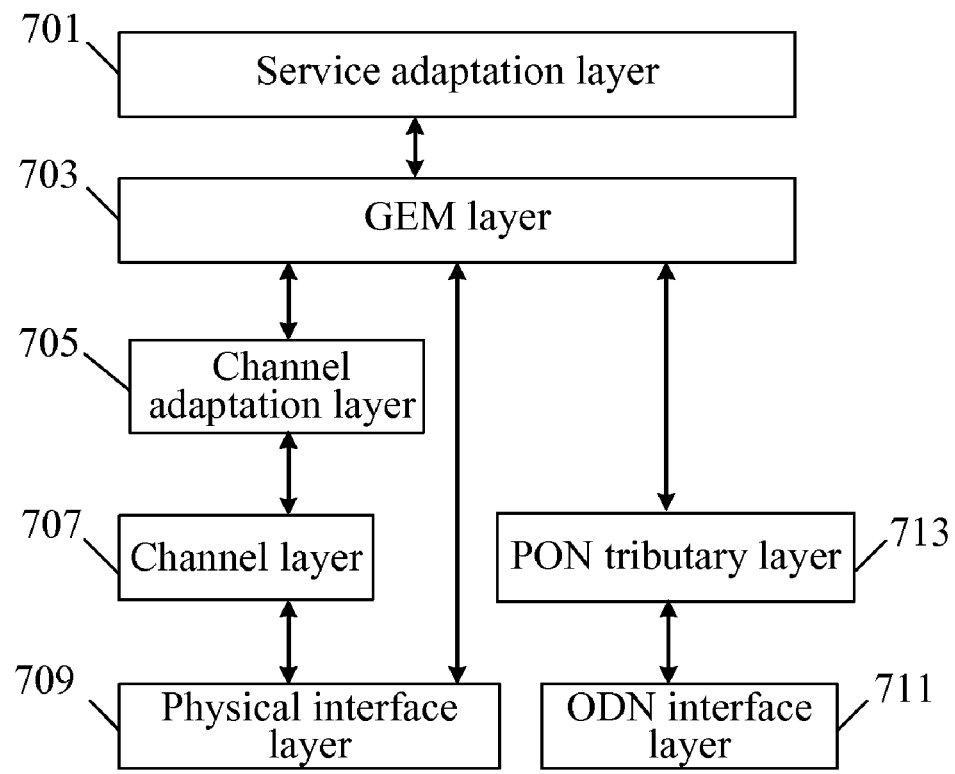
FIG. 10 is a schematic view of a functional model of an S-OLT according to the first embodiment of the present invention.

FIG. 10 shows the functional structure of the S-OLT, which includes a service adaptation layer 701, a GEM layer 703, a channel adaptation layer 705, a channel layer 707, a physical interface layer 709, an ODN interface layer 711, and a PON tributary layer 713.

The service adaptation layer 701 receives and encapsulates the service data sent by the service network into the GEM frame, sends the GEM frame to the GEM layer 703, and decapsulates the GEM frame received from the GEM layer 703 and sends the GEM frame to the service network.

The GEM layer 703 switches the GEM frame from the service adaptation layer 701 to the channel adaptation layer 705, or directly switches the GEM frame to the physical interface layer 709, or switches the GEM frame to the PON tributary layer 713 to form the GPON downstream frame; switches the GEM frame from the PON tributary layer 713 to the service adaptation layer 701, or receives the GEM frame from the channel adaptation layer 705, and switches the GEM frame to the service adaptation layer 701.

The channel adaptation layer 705 maps the GEM frame from the GEM layer to the corresponding transmission channel, and sends the GEM frame to the channel layer 707; de-maps the GEM frame from the transmission channel of the channel layer 707, and sends the GEM frame to the GEM layer 703.

The channel layer 707 sends the transmission channel dispatched by the channel adaptation layer 705 to the corresponding interface of the physical interface layer 709 for transmission, and sends the signal from the physical interface layer 709 to the channel adaptation layer 705.

The physical interface layer 709 is the interface of a physical link connected to the S-OLT and the L-OLTs.

The PON tributary layer 713 encapsulates the GEM frame from the GEM layer 703 into the GPON downstream frame, and sends the GPON downstream frame to the ODN interface layer 711; and extracts the GEM frame from the GPON upstream frame sent by the ODN interface layer 711, and sends the GEM frame to the GEM layer 703.

The ODN interface layer 711 is the interface of the S-OLT connected to the ODN of the PON tributary thereof.

Figure 11:
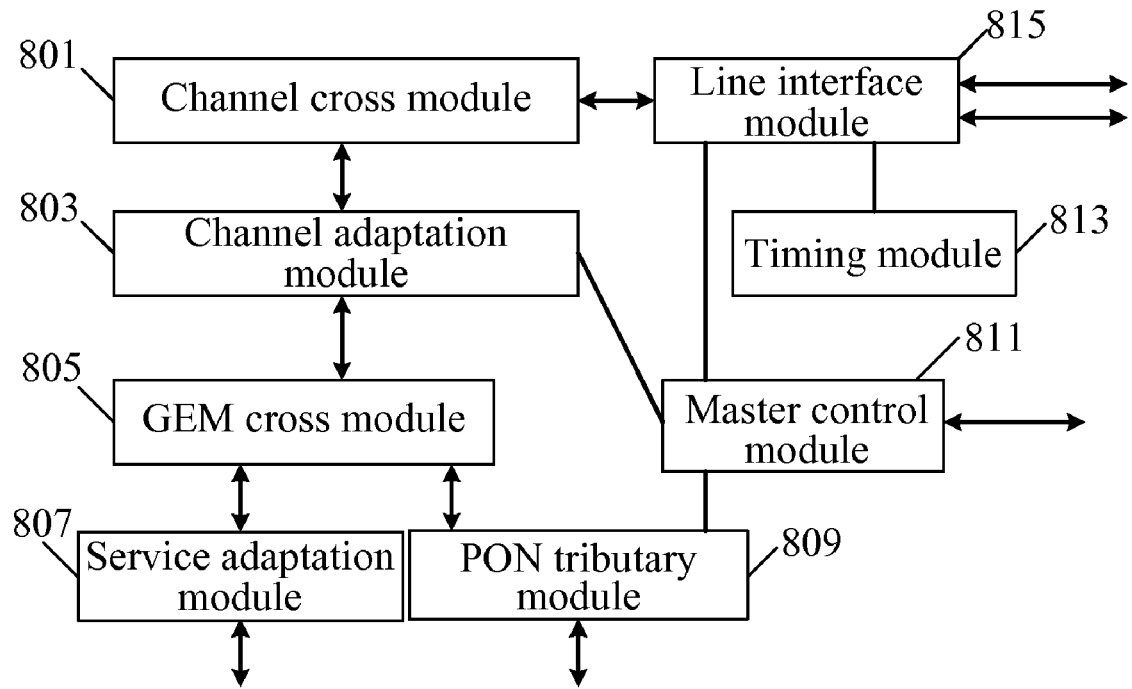
FIG. 11 is a schematic structural view of the S-OLT device according to the first embodiment of the present invention.

According to the analysis on the functions of the S-OLT, the structure of the S-OLT device is as shown in FIG. 11.

FIG. 11 is a schematic structural view of the S-OLT device. The S-OLT device includes a channel cross module 801 implementing a transmission function, a channel adaptation module 803, a line interface module 815, a GEM cross module 805 implementing the GPON function, a service adaptation module 807, a PON tributary module 809, a master control module 811, and a timing module 813.

The line interface module 815 is the interface of the SDH line between the S-OLT and the L-OLTs, for example, an STM-N interface.

The channel cross module 801 is connected to the line interface module 815, and is adapted to send the SDH signal from the SDH line or receive the SDH signal from the SDH line; and is connected to the channel adaptation module 803, and dispatches the VC transmission channel.

The channel adaptation module 803 maps the GEM frame from the GEM cross module 805 to the corresponding transmission channel, for example, the VC channel or the virtual concatenation channel; and de-maps the GEM frame from the transmission channel of the channel cross module 801, and sends the GEM frame to the GEM cross module 805.

Figure 12:
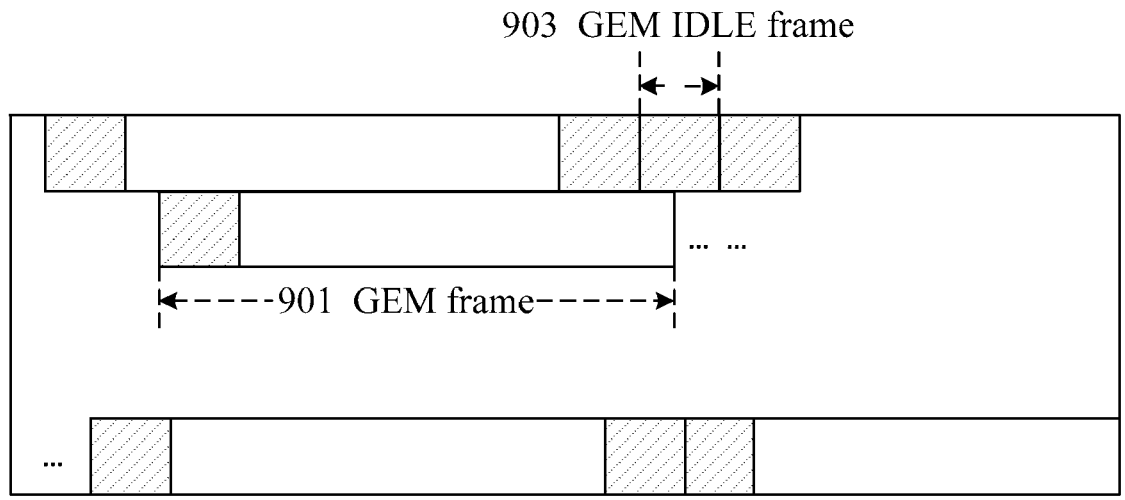
FIG. 12 is a schematic view of adapting a GEM frame to a VC frame according to the first embodiment of the present invention.

FIG. 12 is a schematic structural view of the channel adaptation module 803.

When the channel adaptation module 803 adapts the GEM frame to the VC channel, for example, a VC-4 or other containers, the overhead area of the GEM frame is an integral multiple of the 8-bit byte, and the payload area is also an integral multiple of the 8-bit byte, so that the method for adapting the GEM frame to the VC channel is the same as the method for adapting the GFP frame to the VC channel. When the rate adaptation is required, an idle GEM frame is inserted.

FIG. 12 is a schematic view of adapting the GEM frame into the VC frame, the adaptation of the GEM frame 901 is the same as the adaptation of the GFP frame into the VC channel, in which the GEM IDLE frame 903 is an inserted idle frame. The GEM IDLE frame 903 is a GEM frame without the payload area, and only has the frame header. The idle frame may be indicated by using the standby value of the PTI field in the GEM frame.

The GEM cross module 805 switches the GEM frame to the corresponding port in the channel adaptation module 807 according to the frame header of the GEM frame based on the pre-configured switch matrix, and switches the GEM frame of the channel adaptation module 807 to the PON tributary module according to the frame header.

The service adaptation module 807 removes the encapsulation of the GEM frame sent by the GEM cross module 805, recovers the service data, and sends the service data to the service network; and adapts the service data from the service network into the GEM frame, inserts the corresponding ID to the frame header of the GEM frame according to the destination address information of the service data, and sends the GEM frame to the GEM cross module.

In the upstream direction, when the GEM frames sent by the ONUs on the PON tributaries of the different L-OLTs are mapped to the VC channel together, the GEM frames of the different ONUs need to be differentiated at the S-OLT for switching the GEM frames. In the existing GPON network, a GEM frame is switched according to the PORT-ID field, the PORT-ID is adapted to identify the port number of the ONU in the GEM frame format, which has a length of 12 bits and can indicate 4096 ports. Each PORT-ID of the ONU is unique in all the PON tributaries of the same OLT, so as to identify the service ports of all the ONUs of the OLT tributary. In this embodiment, a network unit composed of a plurality of OLTs includes a plurality of OLTs, and in order to switch the GEM frames, the format of the GEM frames needs to be expanded to differentiate the GEM frames of the ONUs of the different OLT tributaries. The GEM frames may be switched according to an expansion label in the transmission network composed of the plurality of OLTs. Table 1 is an example of the format of the expanded GEM frame.

TABLE 1

| Length | Field Name |
| --- | --- |
| Totally 5 bytes | PLI |
| | PORT-ID |
| | PTI |
| | CRC |
| Totally 2 bytes | Expanded OLT ID |
| | Expanded ODN ID |
| 0 to 4095 bytes | GEM payload |

As shown in Table 1, the expanded OLT ID is added on the basis of the structure of the existing GEM frame for identifying the OLT of the ONU, and the expanded ODN ID is added because one OLT may be connected with a plurality of ODNs. The ODN ID and the OLT ID may uniquely identify a certain PON tributary. In addition, the PORT-ID is added, so as to uniquely identify a certain service port of a certain ONU in the network unit composed of the plurality of OLTs. If all the OLTs in the network are only connected to one ODN, the expanded ODN ID may be omitted. When the ONU generates the GEM frame, the PORT-ID value is added to the frame header of the GEM frame. When the GEM frame reaches the PON tributary module 809, the expanded OLT ID and the expanded ODN ID are added.

However, the length of the expanded OLT ID and the expanded ODN ID field may not be 2 bytes, but is set according to particular demands, and is preferably an integral multiple of 8 bits. Alternatively, the format of the GEM frame may be expanded by using the channel ID. Many expansion methods are available, which are limited to the above description.

In the downstream direction, when the service adaptation module 807 of the S-OLT adapts the service data from the service network into the GEM frame, the values of the PORT-ID, the expanded OLT ID, and the expanded ODN ID of the frame header of the expanded GEM frame in Table 1 are determined according to the destination information of the service data, so that the downstream GEM frame carries the ID information of the destination ONU. The GEM cross module 805 of the S-OLT switches the GEM frame according to the ID information of the destination ONU in the frame header of the GEM frame. In the intermediate L-OLT, the GEM frame in the VC channel is extracted, and is counted and multiplexed again according to the destination information in the GEM frame header. In the destination L-OLT, the received GEM frame is switched to the corresponding PON tributary module 809 according to the PORT-ID in the frame header.

The PON tributary module 809 receives the upstream frame from the PON tributary, extracts the GEM frame, and sends the GEM frame to the GEM cross module 805; and forms the GPON downstream frame by using the GEM frame from the GEM cross module 805, and sends the GPON downstream frame to the ODN of the PON tributary.

The master control module 811 controls each module; receives the network management information from the network manager, transfers the management information, including the information for configuring the PON tributary and the overhead processing, and the management information of the transmission network channel, with the master control modules of other L-OLTs through the communication channel, for example, the designated channel or the DCC channel of the SDH; and sends the status information of the PON tributary and the transmission channel of the S-OLT and the PON tributary and the transmission channel of each L-OLT to the network manager through the communication channel.

The timing module 813 provides timing information, for example, tracks the timing of the SDH.

Figure 13:
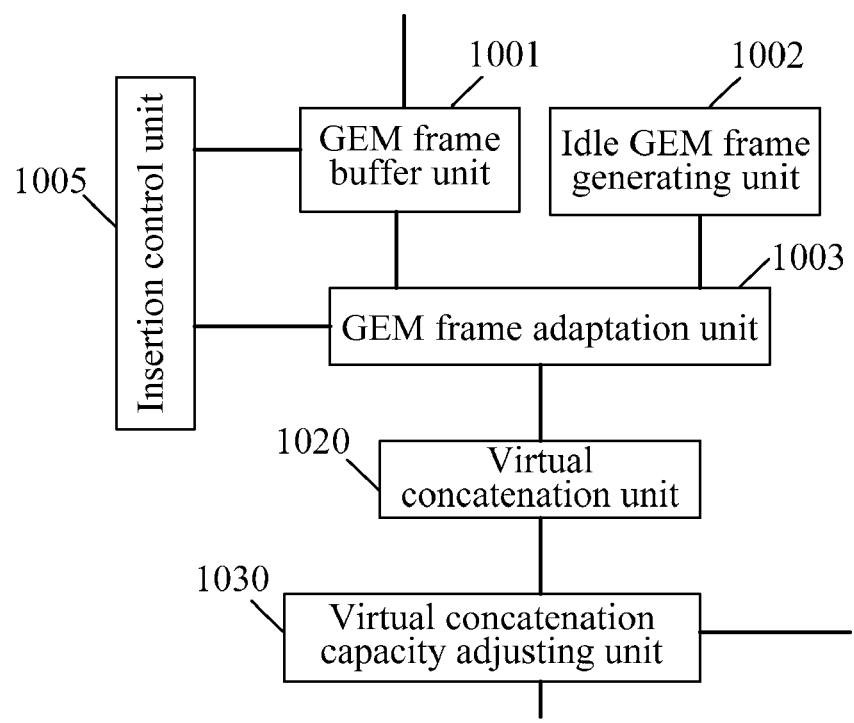
FIG. 13 is a schematic structural view of a channel adaptation module of the S-OLT device according to the first embodiment of the present invention.

FIG. 13 is a structural view of an embodiment of the channel adaptation module.

The channel adaptation module includes a GEM frame buffer unit 1001, an idle GEM frame generating unit 1002, a GEM frame adaptation unit 1003, an insertion control unit 1005, a virtual concatenation unit 1020, and a virtual concatenation capacity adjusting unit 1030.

The GEM frame buffer unit 1001 receives the GEM frame sent from outside to the channel adaptation module, saves the GEM frame in a buffer, and outputs the GEM frame from the buffer under the control of the insertion control unit 1005.

The idle GEM frame generating unit 1002 is adapted to generate the GEM IDLE frame.

The insertion control unit 1005 is adapted to detect the status of the buffer in the GEM frame buffer unit 1001, control the GEM frame adaptation unit 1003 to read one GEM IDLE frame from the idle GEM frame generating unit 1003, and adapt the GEM IDLE frame to the transmission channel if the buffer is null, or control the GEM frame buffer unit 1001 to output one GEM frame if the buffer is not null.

The GEM frame adaptation unit 1003 is adapted to adapt the GEM frame to the transmission channel, in which the adaptation method is the same as the method for adapting the GFP frame to the transmission channel.

The virtual concatenation unit 1020 is adapted to form the virtual concatenation group by using the transmission channel, that is, the VC.

The virtual concatenation capacity adjusting unit 1030 adjusts the capacity of the virtual concatenation group under the control of the master control module of the S-OLT device.

The channel adaptation module may be realized through other structures.

The management information and the status information may be transmitted to the S-OLT through the designated transmission channel, for example, the DCC channel of the SDH/SONET, the monitoring channel of the WDM, or the transmission channel of the GEM frame. A certain channel of the DCC channel of the SDH/SONET or the monitoring channel of the WDM may be pre-configured to be a dedicated channel for the management information and the status information, or the management information and the status information may be encapsulate into the GEM frame, and are identified through standby values of the PTI field of the frame header of the GEM frame.

The L-OLT may be realized by adopting the devices of the S-OLT, or may also be obtained by simplifying functions of the devices of the S-OLT, for example, the L-OLT device may not include the service adaptation module 807. Optionally, if the S-OLT device has a large GEM frame switch matrix, the L-OLT device may not include the GEM cross module 805. The PON tributary module 809 processes the frame header of the received GEM frame, directly sends the GEM frame to the channel adaptation module 803. The GEM frame is mapped to the transmission channel, and is switched after reaching the S-OLT. The L-OLT device may not include the channel cross module 801, and directly sends the transmission channel with the mapped GEM frame to the line interface according to the connection pre-configured by the network manager.

Second Embodiment

In this embodiment, the OLTs are connected to form the ring network by applying the WDM technology. FIG. 9 is a schematic network structural view of the system for GPON data transmission. The network structure according to this embodiment is the same as FIG. 9.

The difference between this embodiment and the first embodiment is that, in this embodiment, the transmission channel is not the VC channel of the SDH, but is the wavelength, and each OLT is connected to the wavelength channel through an optical fiber. The WDM network of this embodiment may be a Reconfigurable Optical Add/Drop Multiplexer (ROADM) or a coarse WDM (CWDM). If the GPON technology is applied, the method for adapting the GEM frame to the wavelength may adopt the following two manners.

In a first manner, the GEM frame is modulated to a designated wavelength directly after a photoelectric conversion. Here, the payload area of the GEM frame must be scrambled, and a scrambling method is the same as the conventional art. The GEM frame must be continuously sent, so as to ensure the clock synchronization of the receiving end, which may be realized by inserting the idle GEM frame.

In a second manner, the GEM frame is modulated to the designated wavelength after being adapted through the OTN. Under the situation, a plurality of GEM frame flows are multiplexed through the OTN technology, the GEM frame may be mapped to the time slot of the ODUk, for example, one byte of the payload area of the OPUK is used as one time slot, or a column is used as one time slot.

The management information of the PON tributary of the L-OLT, for example, the traffic information, may be transmitted to the S-OLT through the monitoring channel, and then the S-OLT sends the management information to the network manager 602. The network manager 602 uniformly controls the dispatching of the wavelength of each L-OLT, and configures and manages the PON tributary through the monitoring channel.

The structure of the S-OLT device according to this embodiment is the same as the structure of the S-OLT device according to the first embodiment as shown in FIG. 11, except that the channel adaptation module 803 adapts the GEM frame to the wavelength channel, and the channel cross module 801 is implemented through the CWDM or the ROADM technology.

Third Embodiment

In this embodiment, the SDH technology is applied.

Figure 14:
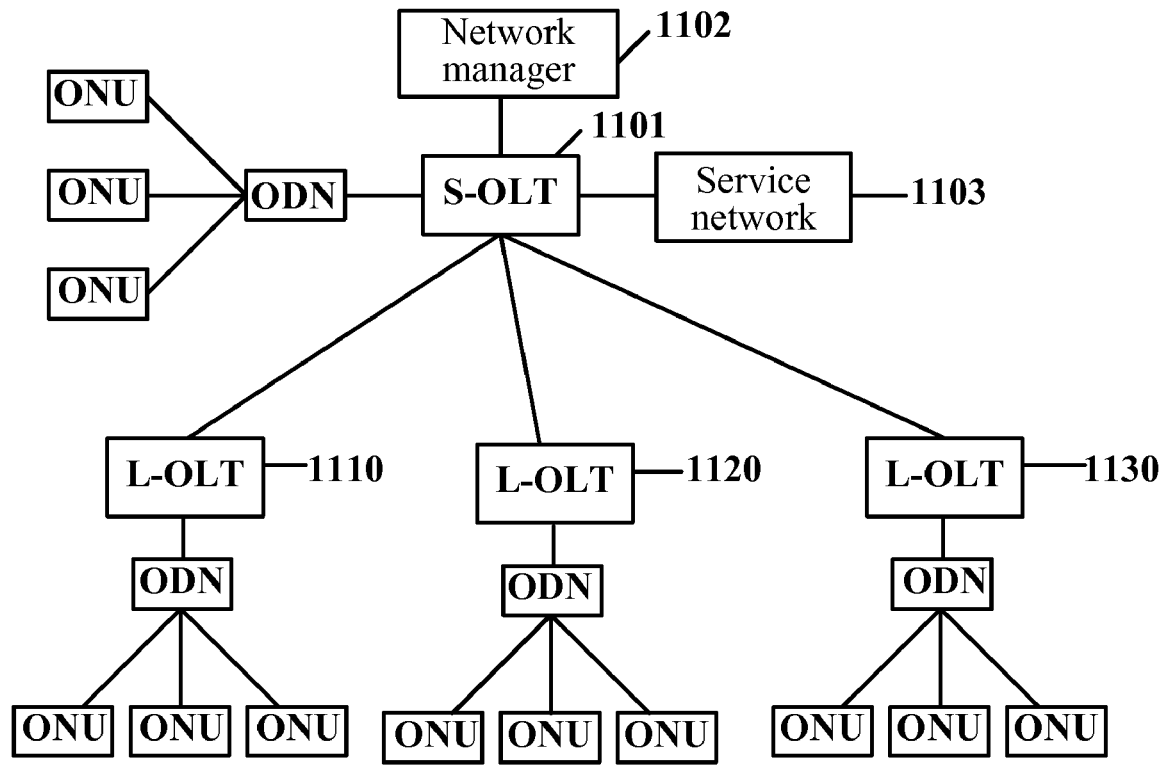
FIG. 14 is a structure view of a system for GPON data transmission according to a third embodiment of the present invention.

FIG. 14 is a schematic network structural view of the system for GPON data transmission according to the third embodiment. The network structure according to this embodiment is the same as the structure as shown in FIG. 14.

In this embodiment, the process for transmitting the service data is the same as the first embodiment, and the functions of the network manager 1102, the service network 1103, and the service network 1106 in the network of this embodiment are the same as the first embodiment.

The structure of the S-OLT device according to this embodiment is the same as the first embodiment.

By adopting the network in a star structure, the network structure is simplified, and the assignment of the transmission channel is simpler than that of the ring network, but the star structure does not have the inherent survivability advantage as the ring network, and cannot realize the loop protection.

Fourth Embodiment

In this embodiment, the present invention provides a mode of directly transmitting the PON network data in the optical fiber.

FIG. 14 is a schematic network structural view of the system for GPON data transmission according to the third embodiment. The network structure according to this embodiment is the same as the third embodiment.

In this embodiment, the functions of the network manager 1102, the service network 1103, and the service network 1106 in the network according to this embodiment are the same as the third embodiment.

The difference between the process for transmitting the service data in this embodiment and the process of the above embodiment is that the PON network data is directly transmitted in the optical fiber, so that the transmission channel in this embodiment is the wavelength in the optical fiber, and PON network data may be directly modulated on the wavelength and sent to the optical fiber.

Figure 15:
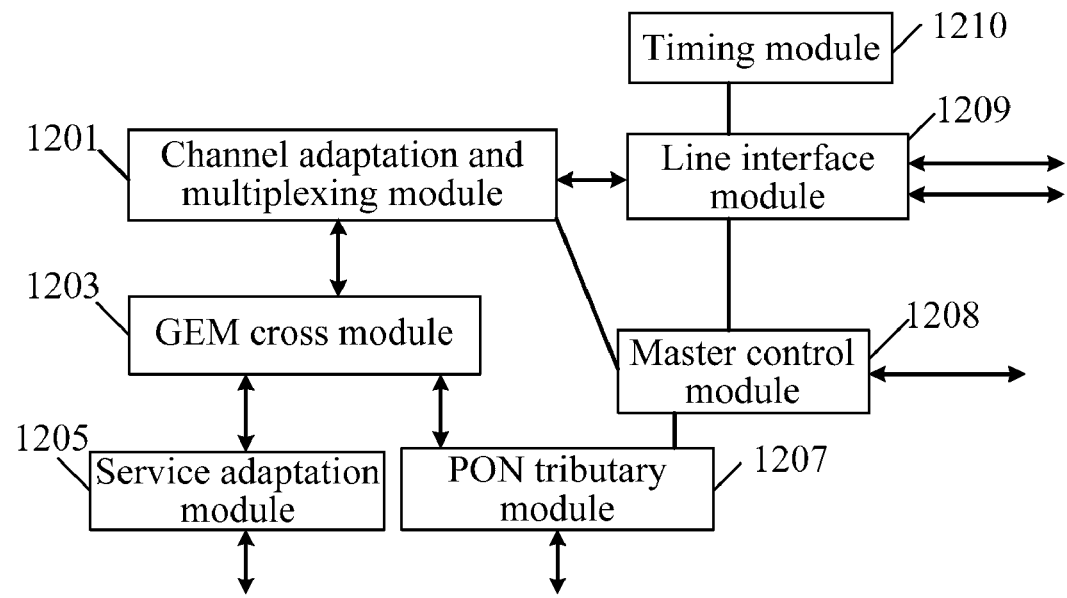
FIG. 15 is a schematic structural view of an S-OLT device according to a fourth embodiment of the present invention.

FIG. 15 is a structural view of the S-OLT device according to this embodiment.

When being applied to the GPON network, the S-OLT device includes a channel adaptation and multiplexing module 1201, a GEM cross module 1203, a service adaptation module 1205, a PON tributary module 1207, a master control module 1208, a line interface module 1209, and a timing module 1210. The functions of other modules except for the channel adaptation and multiplexing module 1201 are consistent with the functions of the corresponding modules in other embodiments.

The channel adaptation and multiplexing module 1201 is adapted to modulate the GEM frame from the GEM cross module 1203 to the wavelength for transmission, demodulate the signal from the line interface module 1209 to obtain the GEM frame, and send the GEM frame to the GEM cross module.

The GEM frame does not have an overhead for performing error code detection on the payload, so that a quality of service (QoS) of the data transmission cannot be ensured. In order to ensure the QoS, the GEM frame may be borne by a simple frame structure, so as to ensure the QoS by using the characteristic of the TDM, for example, by using the GPON upstream or downstream frame structure, or the frame structure of the DTM, so as to ensure the transmission reliability by using the QoS capabilities of the frames.

Figure 16:
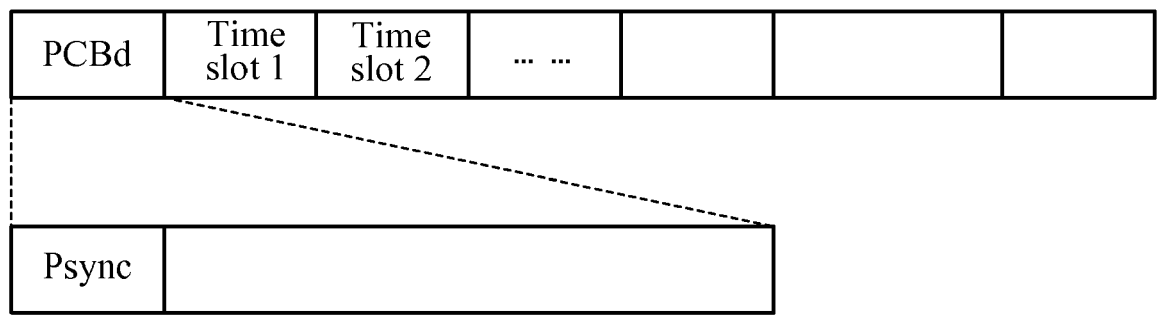
FIG. 16 is a schematic structural view of a GPON frame according to the fourth embodiment of the present invention.

FIG. 16 is a schematic structural view of the GEM frame borne by the GPON frame structure. The frame includes a frame header PCBd, the payload area is divided into several time slots, and the frame header includes the overhead indicating the time slots. The structure of the frame may be defined as required, and is not described here.

Figure 17:
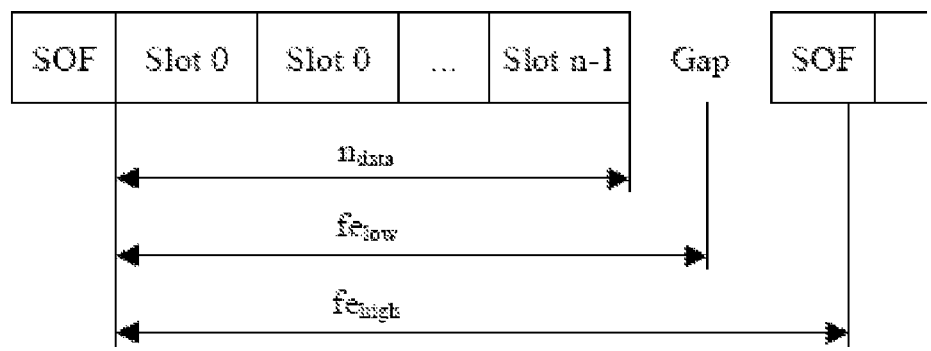
FIG. 17 is a schematic structural view of a DTM frame according to the fourth embodiment of the present invention.

FIG. 17 is a schematic structural view of the GEM frame borne by the DTM frame structure. The start of each frame is a start of frame (SOF) indicator field, and then is the payload area, which is divided into several time slots, and a gap exist between the end of each frame and the start of a next frame. The bandwidth of each time slot of the frame is 512 Kbps, and one channel is composed of several time slots. In the upstream direction, the size of the DTM channel is determined according to the US BW MAP of the GEM flow of the PON tributary, and the GEM flows of the different T-CONTs are respectively mapped to the assigned channels. In the downstream direction, the DTM channel is assigned according to the service types and the number of the nodes, each L-OLT node receives the corresponding channel, de-maps the GEM frame, switches the GEM frame to the downstream direction of the PON tributary, and sends the GEM frame to each ONU.

In the network according to the embodiment of the present invention, the L-OLTs may be directly connected through the optical fiber for communication, and the method may be easily achieved from the above embodiments, and will not be described here.

The transmission channel may be the channel defined by the existing transmission network, for example, the VC channel of the SDH, the VT channel of the SONET, the ODUk of the OTN, the wavelength channel of the pure optical network, the DTM time slot channel, the VPI channel of the ATM, or other time slot channels having the fixed size frame format. Further, the transmission channel of the shared media may also be selected, but the expansion label must be added to the GEM frame of each L-OLT, and each OLT expansion label forwards and switches the GEM frame.

In addition to the ring network and the star network, the transmission network may adopt other networking modes, for example, a mesh network.

The technical solutions may be applied to the EPON, the APON, the BPON, and other PON networks after simple adjustment, and the detailed implementation is not described here.

It can be known from the above embodiments that, in the system for PON data transmission according to the embodiment of the present invention, the S-OLT and the L-OLT are connected through the transmission link, so that the S-OLT directly sends the service data of the L-OLT to the service network.

In the method for PON data transmission according to the embodiment of the present invention, the S-OLT and the L-OLT are connected through the transmission link, so that the L-OLT sends the service data to the S-OLT, and the S-OLT directly sends the received service data of the L-OLT to the service network.

In the method for PON data transmission according to the embodiment of the present invention, the S-OLT and the L-OLT are connected, so that the S-OLT directly sends the service data of the L-OLT to the service network.

In the method for PON data transmission according to the embodiment of the present invention, the L-OLT and the S-OLT are connected, so that the S-OLT directly sends the service data of the L-OLT to the service network.

The device for PON data transmission according to the embodiment of the present invention has the functions of the PON network and the functions of the transmission network, and is capable of directly sending the PON service data to the service network.

Another device for PON data transmission according to the embodiment of the present invention has the functions of the PON network and the functions of the transmission network, and is capable of sending the PON service data to other nodes through the transmission link.

The above descriptions are merely a part of the embodiments of the present invention, but are not intended to limit the protection scope of the present invention. Any modification, equivalent replacement, and improvement without departing from the spirit and principle of the present invention fall within the protection scope of the present invention.

What is claimed is:

1. A system for passive optical network (PON) data transmission, connected to a service network, and comprising at least one first optical network unit (ONU), a central office optical line terminal (OLT) (S-OLT), and a local OLT (L-OLT), wherein
    the S-OLT and the L-OLT are connected through a transmission link to form a transmission network;
    the S-OLT is adapted to connect to the service network, receive service data sent by the service network, and send the service data to the L-OLT through a transmission channel of the transmission network, wherein sending the service data to the L-OLT through the transmission channel of the transmission network comprises: encapsulating the service data to be sent to the L-OLT into a Gigabit PON (GPON) encapsulation method (GEM) frame, and then mapping the GEM frame to the transmission channel, wherein the transmission channel is any one of an Virtual Container (VC) channel of the Synchronous Digital Hierarchy (SDH), an Virtual Tributary (VT) channel of the (Synchronous Optical Network) SONET, the Optical channel Data Unit k (ODUk) of the Optical Transport Network (OTN), the Dynamic synchronous Transfer mode (DTM) time slot channel, and the Virtual Path Identifier (VPI) channel of the Asynchronous Transfer Mode (ATM); and receive service data sent by the L-OLT from the transmission channel of the transmission network, and send the service data to the service network; and
    the L-OLT is adapted to receive the service data sent by the S-OLT from the transmission channel of the transmission network, and send the service data to a first ONU; and receive service data sent by the first ONU, and send the service data to the S-OLT through the transmission channel of the transmission network.

2. The system according to claim 1, further comprising at least one second ONU, wherein
the S-OLT is further adapted to send the service data sent by the service network to the second ONU; and send the service data sent by the second ONU to the service network.

3. The system according to claim 1, further comprising at least one second ONU, wherein the S-OLT is further adapted to send the service data sent by the L-OLT to the second ONU, and send the service data sent by the second ONU to the L-OLT through the transmission channel of the transmission network.

4. The system according to claim 1, wherein
the S-OLT is further adapted to send the service data sent by a first L-OLT to a second L-OLT through the transmission channel of the transmission network.

5. The system according to claim 1, wherein
the S-OLT is further adapted to detect a traffic flow from the service network and/or classify service flows, and assign the transmission channel according to a detection result and/or classification information.

6. The system according to claim 1, wherein
the L-OLT is further adapted to send status information of a PON tributary and status information of the transmission channel of the transmission network to the S-OLT through an agreed communication channel, receive management information from the agreed communication channel, and configure the local transmission channel and the PON tributary according to the management information; and
the S-OLT is further adapted to generate the management information for the transmission channel and/or the PON tributary according to the status information sent by the L-OLT and received from the agreed communication channel, and send the management information to the L-OLT through the agreed communication channel.

7. The system according to claim 1, further comprising:
a network manager, connected to the S-OLT, and adapted to configure the transmission channel of the transmission network and each PON tributary.

8. The system according to claim 7, wherein
the S-OLT is further adapted to detect a traffic flow from the service network and/or classify service flows, and send a detection result and/or classification information to the network manager; and
the network manager assigns the transmission channel according to the detection result and/or the classification information sent by the S-OLT.

9. The system according to claim 1, further comprising:
a network manager, connected to the S-OLT, and adapted to generate management information for configuring the transmission channel and/or a PON tributary according to received status information of the transmission channel of the transmission network and/or the PON tributary, and send the generated management information to the S-OLT, wherein
the L-OLT is further adapted to send the status information of the PON tributary and/or the status information of the transmission channel of the transmission network to the S-OLT through an agreed communication channel; and receive the management information from the agreed communication channel, and configure the PON tributary and/or the local transmission channel according to the management information; and the S-OLT is further adapted to send the status information received from the L-OLT to the network manager; and configure the local transmission channel and/or the PON tributary according to the management information sent by the network manager, and send the management information for the L-OLT to the L-OLT through the agreed communication channel.

10. The system according to claim 6, wherein
the L-OLT is adapted to send the status information of the PON tributary to the S-OLT through a Data Communication Channel (DCC) of the (SDH)/SONET, a monitoring channel of Wavelength Division Multiplexing (WDM), or a GEM frame; and receive the management information from the DCC channel of the SDH/ SONET, the monitoring channel of the WDM, or the transmission channel of the GEM frame; and
the S-OLT is adapted to receive the status information sent by the L-OLT from the DCC channel of the SDH/SONET, the monitoring channel of the WDM, or the transmission channel of the GEM frame; and send the management information to the L-OLT through the DCC channel of the SDH/SONET, the monitoring channel of the WDM, or the transmission channel of the GEM frame.

11. The system according to claim 1, wherein
the S-OLT is further adapted to select the transmission channel for adapting the GEM frame according to service types before adapting the GEM frame to the transmission channel, and directly map the GEM frame of the emergent service or the service having a higher demand for real-time performance to the designated transmission channel; and/or
the L-OLT is further adapted to select the transmission channel for adapting the GEM frame according to the service types before adapting the GEM frame to the transmission channel, and directly map the GEM frame of the emergent service or the service having a higher demand for real-time performance to the designated transmission channel.

12. A method for passive optical network (PON) data transmission, comprising:
connecting a central office optical line terminal (OLT) (S-OLT) and a local OLT (L-OLT) through a transmission link to form a transmission network, wherein the S-OLT connects to a service network;
receiving, by the L-OLT, service data sent by a first optical network unit (ONU), and transmitting the service data to the S-OLT through a transmission channel of the transmission network;
receiving, by the S-OLT, the service data sent by the L-OLT from the transmission channel of the transmission network, and sending the service data to the service network;
receiving, by the S-OLT, the service data sent by the service network, and sending the service data to the L-OLT through the transmission channel of the transmission network, wherein sending the service data to the L-OLT through the transmission channel of the transmission network comprises: encapsulating the service data to be sent to the L-OLT into a Gigabit PON (GPON) encapsulation method (GEM) frame and then mapping the GEM frame to the transmission channel, wherein the transmission channel is any one of an Virtual Container (VC) channel of the Synchronous Digital Hierarchy (SDH) an Virtual Tributary VT channel of the Synchronous Optical Network) SONET, the Optical channel Data Unit k (ODUk) of the Optical Transport Network (OTN), the Dynamic synchronous Transfer mode (DTM) time slot channel and the Virtual Path Identifier (VPI) channel of the Asynchronous Transfer Mode (ATM); and receiving, by the L-OLT, the service data sent by the S-OLT from the transmission channel of the transmission network, and sending the service data to the first ONU.

13. The method according to claim 12, further comprising: sending, by the S-OLT, the service data sent by the service network to a second ONU;

and sending the service data sent by the second ONU to the service network.

14. The method according to claim 12, wherein a frame header of the GEM frame further comprises an OLT identifier (ID) and/or an optical distribution network (ODN) ID, and wherein the S-OLT adapts the GEM frame to the transmission channel and sends the GEM frame to a second L-OLT, or decapsulates the GEM frame to obtain the service data and sends the service data to the service network, or sends the GEM frame to the second ONU according to the frame header of the GEM frame sent by a first L-OLT and received from the transmission channel; the S-OLT encapsulates the service data sent by the service network into the GEM frame, generates the frame header of the GEM frame according to destination information of the service data, and adapts the GEM frame to the transmission channel, or sends the GEM frame to the second ONU; and the L-OLT adds the L-OLT ID and/or the ODN ID to the frame header of the GEM frame sent by the first ONU; and sends the GEM frame to the first ONU, or adapts the GEM frame to the transmission channel according to the frame header of the GEM frame sent by the S-OLT and received from the transmission channel.

15. The method according to claim 12, further comprising: configuring, by a network manager, the transmission channel of the transmission network and/or each PON tributary through the S-OLT.

16. The method according to claim 15, wherein the configuring, by the network manager, the transmission channel of the transmission network and/or each PON tributary through the S-OLT comprises:

transmitting, by the L-OLT, status information of the PON tributary and/or the transmission channel to the S-OLT through an agreed communication channel;

sending, by the S-OLT, the received status information, and/or status information of the local PON tributary and/or the local transmission channel to the network manager;

generating, by the network manager, management information for configuring the transmission channel and/or the PON tributary according to the received status information, and sending the generated management information to the S-OLT;

configuring, by the S-OLT, the local transmission channel and/or the PON tributary according to the management information sent by the network manager, and sending the management information for the L-OLT to the L-OLT through the agreed communication channel; and receiving, by the L-OLT, the management information from the agreed transmission channel, and configuring the local transmission channel and/or the PON tributary according to the management information.

17. The method according to claim 16, wherein the agreed communication channel is a transmission channel of the GEM frame;

the L-OLT encapsulates the status information into the GEM frame, identifies the frame by using a payload type indicator (PTI) field of a frame header of the GEM frame, and sends the GEM frame to the S-OLT through the transmission channel;

the S-OLT receives the GEM frame from the transmission channel, extracts the status information according to identification of the PTI field, and sends the status information to the network manager;

the S-OLT encapsulates the management information sent by the network manager into the GEM frame, identifies the frame by using the PTI field of the frame header of the GEM frame, and sends the GEM frame to the L-OLT through the transmission channel; and the L-OLT receives the GEM frame from the transmission channel, extracts the management information, and configures the local transmission channel and/or the PON tributary according to the management information.

18. The method according to claim 16, wherein the status information of the PON tributary sent by the L-OLT is a dynamic bandwidth assignment (DBA) request, traffic information of a transmission container (T-CONT), or upstream bandwidth map (US BW MAP) information of a GPON sent by the first ONU on the PON tributary; and the management information sent by the network manager is information for configuring a capacity of the transmission channel.

19. The method according to claim 16, further comprising: performing, by the S-OLT, traffic monitoring on downstream service data, or on upstream service data, obtaining a monitoring result, and sending the monitoring result to the network manager;

generating, by the network manager, the management information for configuring a capacity of the transmission channel according to a traffic result sent by the S-OLT, and sending the management information to the S-OLT; and receiving, by the S-OLT, the management information sent by the network manager, configuring the capacity of the transmission channel according to the information, and sending the management information to the L-OLT through the transmission channel.

20. The method according to claim 12, further comprising: directly connecting two L-OLTs through the transmission link, and exchanging the service data through the transmission channel of the transmission link.

* * * * *